United States Patent
Kimura et al.

(10) Patent No.: US 7,145,885 B1
(45) Date of Patent: Dec. 5, 2006

(54) METHOD FOR DELIVERING DATA RESOURCES

(75) Inventors: Masaya Kimura, Kobe (JP); Katzumi Hayashi, Kobe (JP); Taichi Ujigawa, Kobe (JP); Yasutaka Oda, Kobe (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 09/667,513

(22) Filed: Sep. 22, 2000

(30) Foreign Application Priority Data

Dec. 1, 1999 (JP) .................................. 11-341801

(51) Int. Cl.
*H04B 3/36* (2006.01)

(52) U.S. Cl. ........................... 370/293; 370/401

(58) Field of Classification Search ............... 370/217, 370/351–354, 389, 390, 401, 432, 486, 293
See application file for complete search history.

(56) References Cited

U.S. PATENT DOCUMENTS

| | | | |
|---|---|---|---|
| 5,790,536 A * | 8/1998 | Mahany et al. ............. | 370/338 |
| 6,154,463 A * | 11/2000 | Aggarwal et al. .......... | 370/408 |
| 6,272,598 B1 * | 8/2001 | Arlitt et al. ................. | 711/133 |
| 6,446,109 B1 * | 9/2002 | Gupta ......................... | 709/203 |
| 6,546,002 B1 * | 4/2003 | Kim ............................ | 370/351 |
| 6,564,233 B1 * | 5/2003 | Fleischman ................ | 707/203 |
| 6,640,241 B1 * | 10/2003 | Ozzie et al. ................ | 709/204 |

FOREIGN PATENT DOCUMENTS

| | | |
|---|---|---|
| JP | 6-104979 | 4/1994 |
| JP | 7-21100 | 1/1995 |
| JP | 9-146858 | 6/1997 |
| JP | 9-245666 | 9/1997 |
| JP | 11-73192 | 3/1999 |
| JP | 11-88416 | 3/1999 |

* cited by examiner

*Primary Examiner*—Seema S. Rao
*Assistant Examiner*—Donald L Mills
(74) *Attorney, Agent, or Firm*—Staas & Halsey LLP

(57) ABSTRACT

A mobile terminal system transmits a request message to a delivering source system. The request message specifies resources to be delivered, and a relay system for receiving the resources. The delivering source system delivers the specified resources to the specified relay system according to the request message. The relay system holds the resources. The mobile terminal system is connected to the relay system, and receives the resources from the relay system.

9 Claims, 35 Drawing Sheets

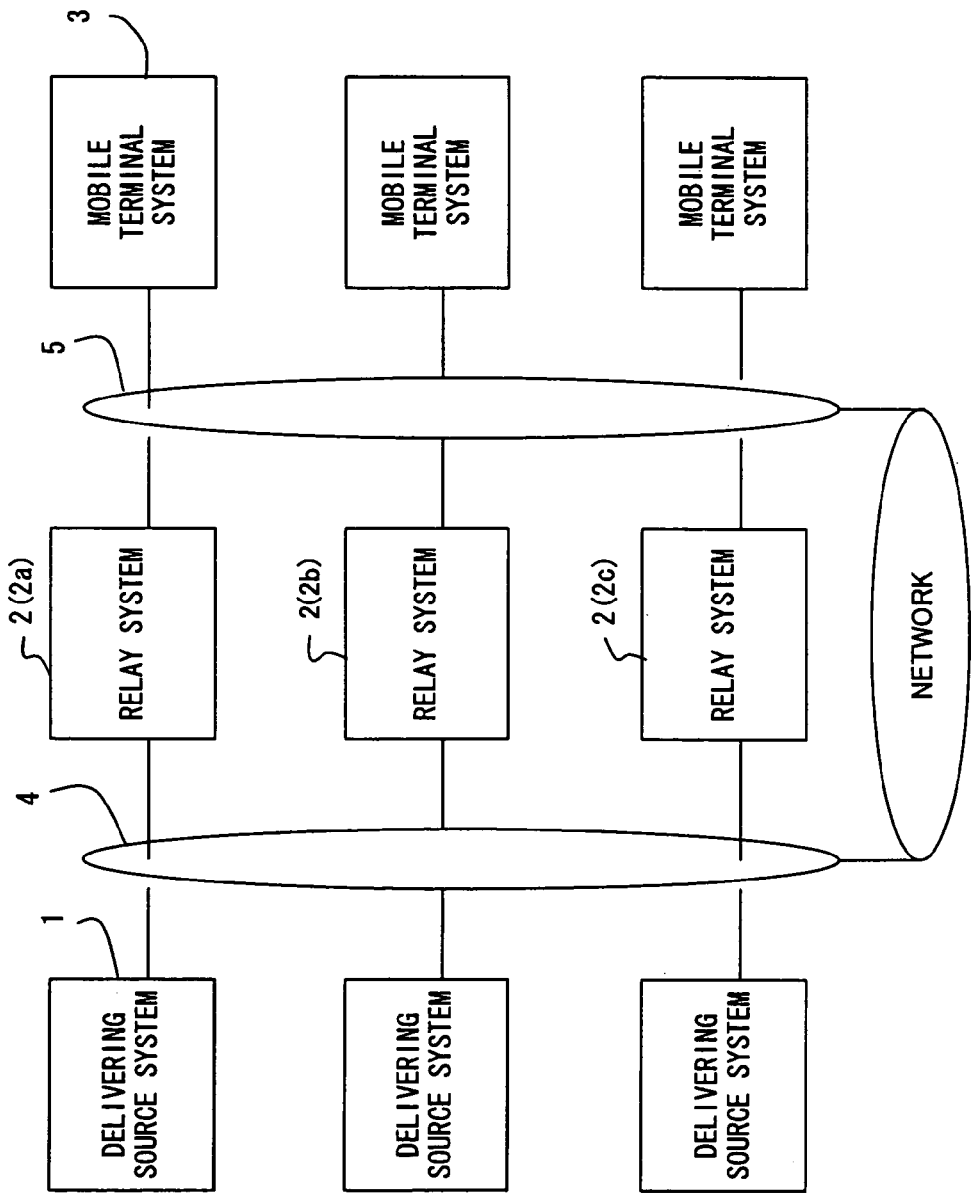
F I G. 1

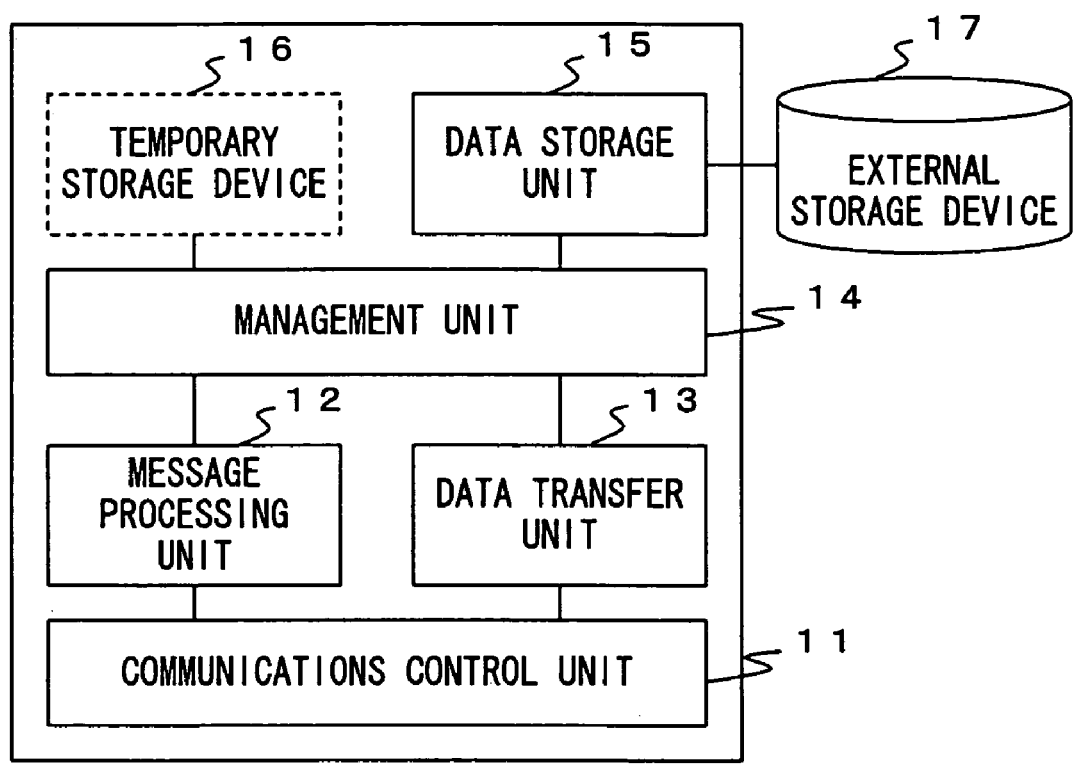
F I G. 4

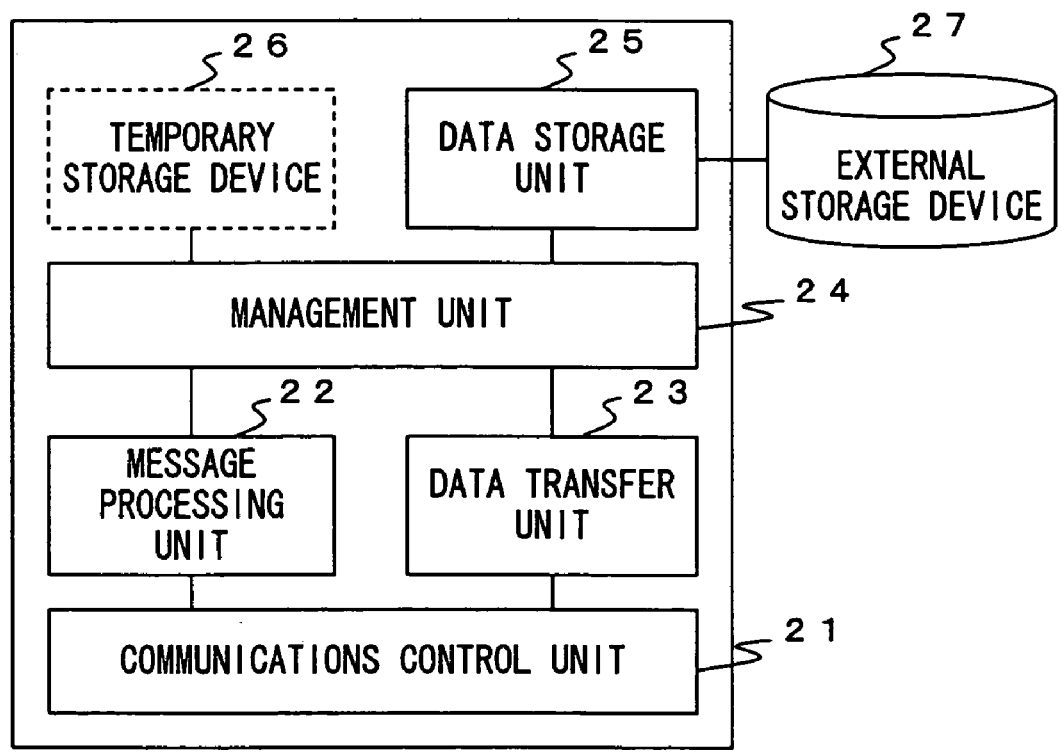
F I G. 5

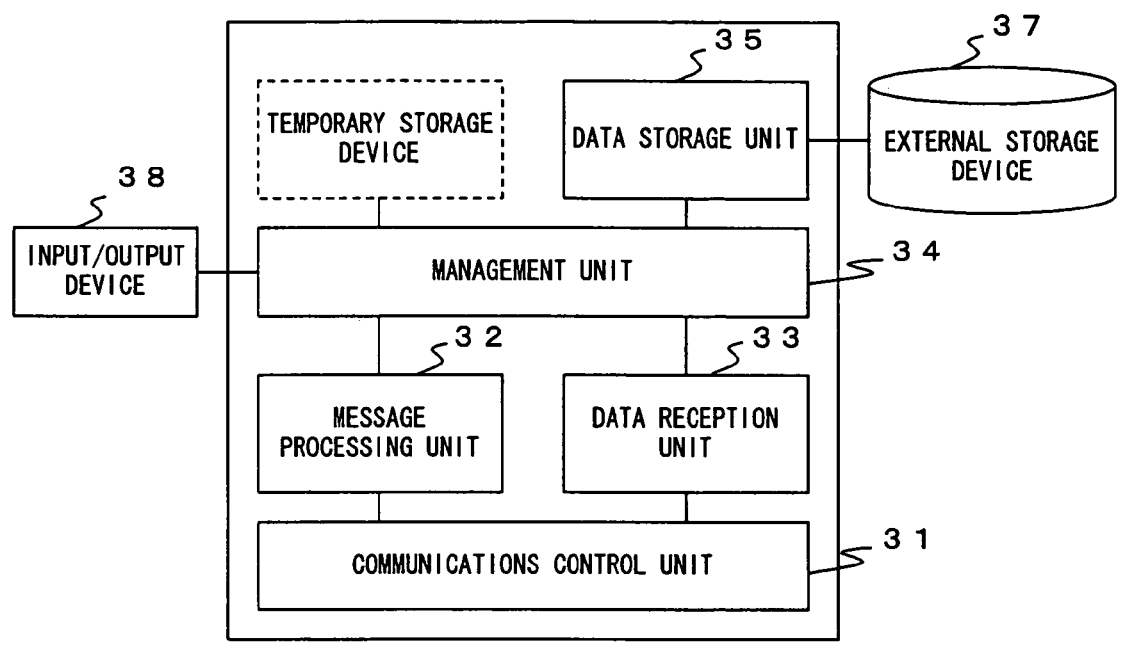
F I G. 6

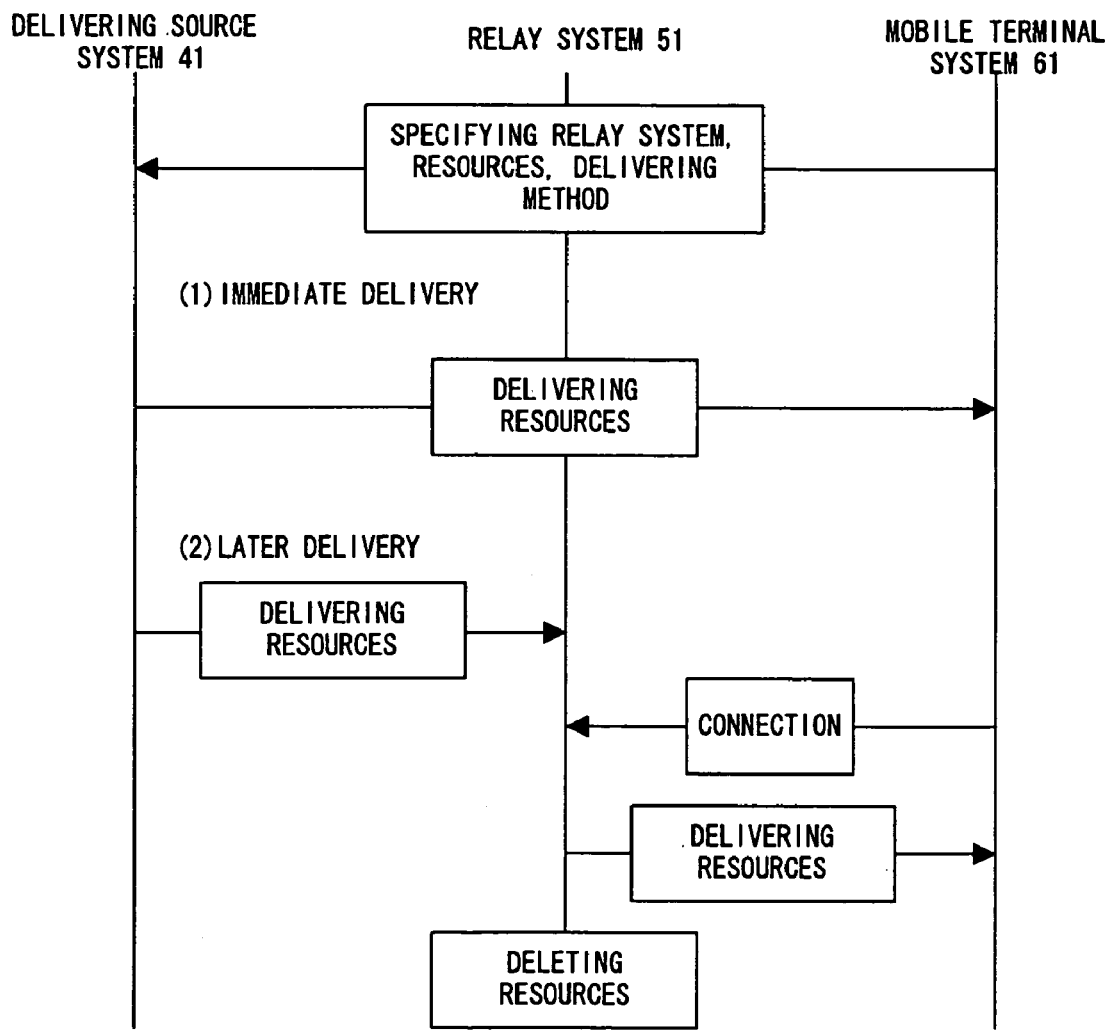
F I G. 7

FIG. 20A

| MOBILE TERMINAL | STATE |
|---|---|
| 61 | NOT DELIVERED |
| 62 | NOT DELIVERED |

FIG. 20B

| MOBILE TERMINAL | STATE |
|---|---|
| 61 | DELIVERED |
| 62 | NOT DELIVERED |

FIG. 20C

| MOBILE TERMINAL | STATE |
|---|---|
| 61 | DELIVERED |
| 62 | DELIVERED |

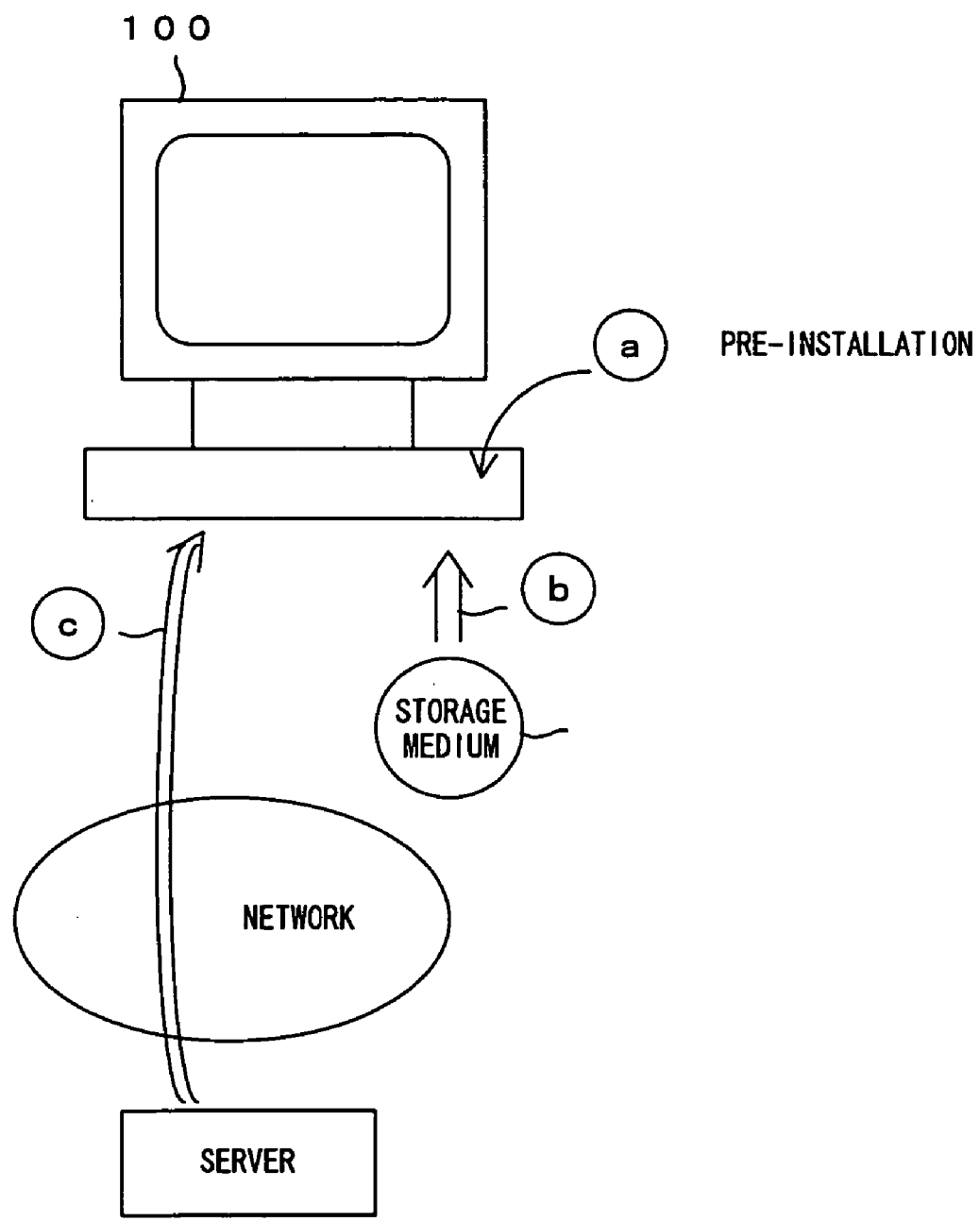
F I G. 3 1

METHOD FOR DELIVERING DATA RESOURCES

BACKGROUND OF THE INVENTION

1. Field of the Invention

The present invention relates to a method for delivering data resources to a terminal device, and more specifically to a method for delivering resources to a portable handy information communications terminal.

2. Description of Related Art

Conventionally, various methods of efficiently delivering data resources (hereinafter referred to simply as "resources") such as software programs, data, etc. to a terminal device have been suggested and put to practical use.

For example, a method (Japanese Patent Publication No. 7-21100) of reducing the number of terminal devices which cannot receive resources by repeatedly broadcasting resources to a terminal devices from a delivering source system several times, a method (Japanese Patent Publication No. 9-146858) of generating a terminal device list for reaching a terminal device to which resources have to be delivered by referring to a relay information entered in advance, and sequentially transferring the list with the resources to an adjacent relay system, etc. are well known.

However, in the method described in these publications, the configuration in which a mobile terminal (portable handy information communications terminal) is used as a destination terminal device to which resources are to be delivered has not been taken into account.

A method of delivering resources to a mobile terminal can be, for example, a system (Japanese Patent Publication No. 9-245666) of receiving resources from a delivering source system through a relay device when relay devices exist between the delivering source system and a mobile terminal, and the mobile terminal enters a radio area of any relay system, etc.

However, when it is not considered that a destination terminal device to which resources are to be delivered is a mobile terminal, the following problem occurs when the terminal device moves.

Basically, since a resource delivering route is predetermined such that the optimum resource delivery can be attained between a source system and a destination terminal device when the destination terminal device is connected to a network at a predetermined location, the resource delivering efficiency is lowered if the terminal device is moved to another location.

In a system where several relay devices exist between a delivering source system and a destination terminal device, it has not been possible to recognize onto which relay device the resources requested by a user of the destination terminal device has been downloaded has not been provided even on the assumption that the terminal device can select an available relay device. Therefore, the destination terminal sometimes can not receive the resources.

In a system to which resources are periodically delivered (for example, a push-type newspaper delivering system), a terminal device may not obtain the resources if it moves from a predetermined location to another location.

Furthermore, even in a method used on the assumption that a destination terminal device to which resources are to be delivered can be moved, the following problems occur.

To receive resources at a moved-to location, it is necessary for a terminal device to request a delivering source system to deliver the resources after having arrived at the moved-to location. Therefore, when there is a large amount of data of the resources to be delivered, it takes a long time to obtain desired resources after arriving a destination.

In the system for delivering resources at a request from a terminal device, there is a fee for the communications between the terminal device and a relay system during the transfer of the resources from a delivering source system to the relay device. Therefore, a wasteful communications cost is required when a large amount of data of resources is delivered.

SUMMARY OF THE INVENTION

The present invention aims at delivering data resources to a mobile terminal device without fail and improving the delivering efficiency. It also aims at providing a method of delivering resources which does not require the terminal device to consider a relay device to be connected.

The resource delivering method according to the present invention is used in a system where a plurality of relay devices exist between a delivering source device which delivers resources and a terminal device which receives the resources. The method includes: notifying from the terminal device to the delivering source device of the information specifying a relay device for receiving the resources delivered from the delivering device, delivering the resources from the delivering source device to the relay device specified by the notification, and delivering the resources from the relay device to the terminal device according to an access by the terminal device.

In this method, a relay device which receives the resources delivered from a delivering source device is specified by a terminal device. Therefore, the terminal device can receive desired resources through a desired relay device. It is not necessary for the terminal device to connect the line to the relay device while the resources are delivered from the delivering source device to the relay device. Therefore, there are no communications costs required between the terminal device and the relay device.

In addition, the terminal device can specify several relay devices. In this case, since the resources are delivered to the specified relay devices, the terminal device can receive desired resources from any relay device the terminal devices. When one of the plurality of relay devices delivers the resources to the terminal device, the relay device notifies other relay devices that the resources have been delivered. Therefore, each relay device can discard unnecessary resources according to the notification.

The resources delivering method according to another aspect of the present invention includes: notifying from the terminal device to the first relay device of information specifying the resources to be delivered, accessing from the first relay device to the delivering source device which provides the specified resources and obtaining the resources, delivering the resources from the first relay device to the second relay device, and delivering the resources from the first or second relay device to the relay device In response to an access from the terminal device.

In this method, a relay device obtains the resources requested by a terminal device, and delivers the resources to another relay device. Therefore, the terminal device can receive desired resources from any relay device in a plurality of relay devices. That is, the terminal device can receive the desired resources without considering a relay device.

BRIEF DESCRIPTION OF THE DRAWINGS

FIG. 1 shows the entire configuration of the resources delivering system according to an embodiment of the present invention;

FIG. 4 shows the configuration of the delivering source system;

FIG. 5 shows the configuration of the relay system;

FIG. 6 shows the configuration of the mobile terminal system;

FIG. 7 shows a first example of resource delivering sequence;

FIGS. 20A through 20C show examples of a mobile terminal management list;

FIG. 31 shows the method of providing a software program relating to the present invention;

DESCRIPTION OF THE PREFERRED EMBODIMENTS

Figure 2:
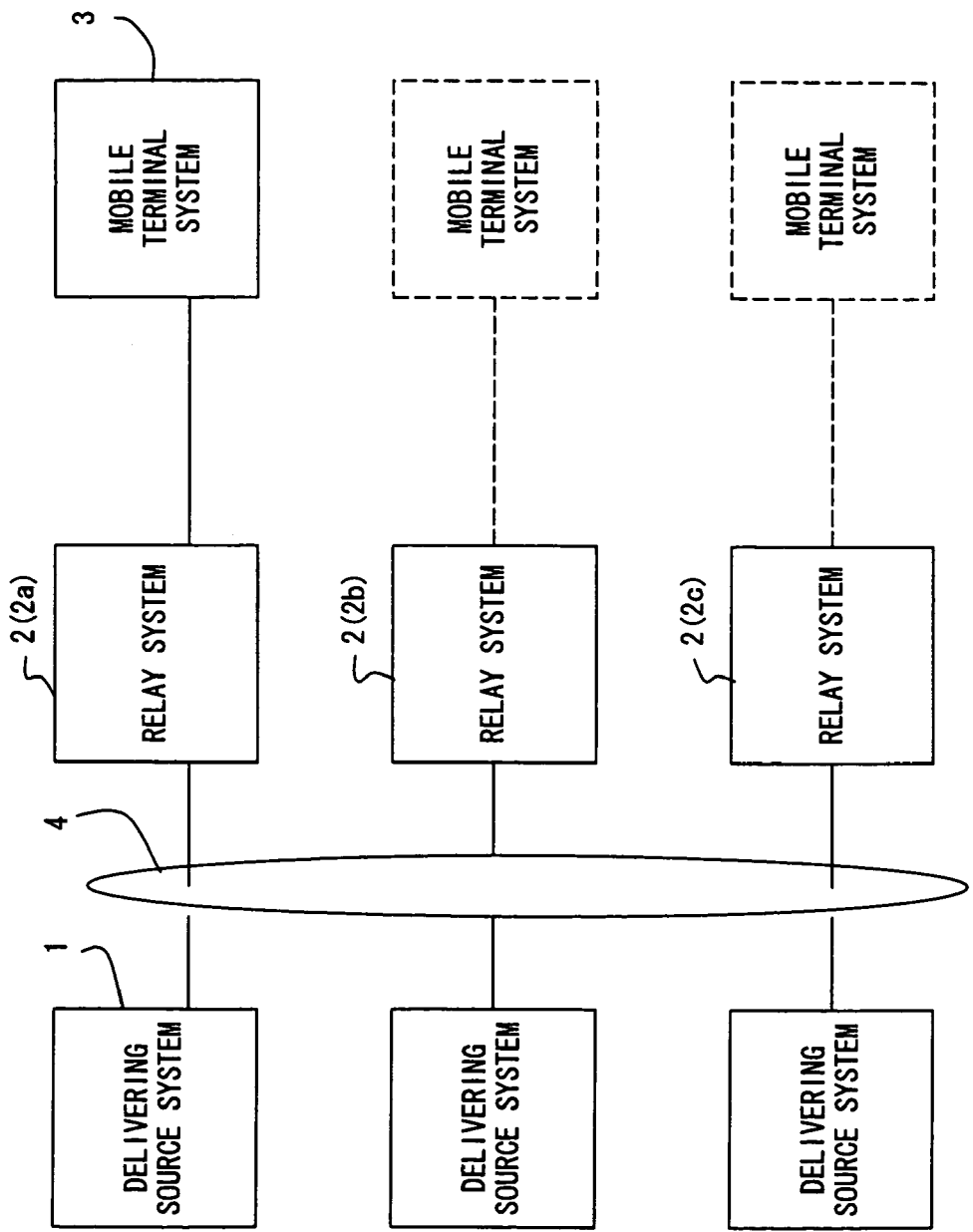
FIG. 2 shows the entire configuration of the resources delivering system according to another embodiment of the present invention.

The embodiment of the present invention is described below by referring to the attached drawings.

FIG. 1 shows the entire configuration of the resource delivering system according to an embodiment of the present invention. With the resource delivering system, resources are delivered from a delivering source system to a mobile terminal system through a relay system.

A delivering source system 1 is, for example, a server computer, and stores resources (data resources: software program, data, etc.). The delivering source system 1 delivers resources to a relay system 2 autonomously or at a request from a user or a mobile terminal system 3. The delivering source system 1 can also deliver resources directly to the mobile terminal system 3 without the relay system 2. In addition, there can be a plurality of the delivering source systems 1.

The relay systems 2 (2a through 2c) is provided below the delivering source system 1, and transfers a resource delivering request from the mobile terminal system 3 to the delivering source system 1 as necessary. The relay system 2 temporarily stores the resources transmitted from the delivering source system 1 as necessary, and delivers them to the mobile terminal system 3. There are a plurality of relay systems 2 in the resource delivering system.

The mobile terminal system 3 is provided below the relay system 2, and issues a resource delivering request to the delivering source system 1 or the relay system 2. The mobile terminal system 3 can be connected to any of the relay systems 2a through 2c, and obtains resources from the connected relay system. There are one or more mobile terminal systems 3 in the resource delivering system.

A network 4 connects the delivering source system 1 with the relay system 2, and a network 5 connects the relay system 2 with the mobile terminal system 3. The line (transmission line) in the network 4 and the network 5 can be an optical fiber, a metal cable, or a radio path. In addition, the network 4 and the network 5 can be public networks, or private networks. Furthermore, the communications protocols in the network 4 and the network 5 are not limited.

The network 4 and the network 5 can be the same networks or different networks. The delivering source system 1 and the mobile terminal system 3 can transmit and receive data without the relay system 2.

In the above mentioned resource delivering system, the mobile terminal system 3 can access the delivering source system 1 without the relay systems 2a through 2c, or through any of the relay systems 2a through 2c. The mobile terminal system 3 can receive resources without the relay systems 2a through 2c, or through any of the relay systems 2a through 2c. The mobile terminal system 3 can specify a relay system for receiving resources from the delivering source system 1.

For example, assume that the relay system 2a is located in Tokyo, and the relay system 2b is located in Osaka. Also assume that the mobile terminal system 3 (that is, the user) is currently located in Tokyo, and the user requests to receive specific resources from the delivering source system 1 after having moved to Osaka. In this case, the mobile terminal system 3 issues a resource delivering request to the delivering source system 1. At this time, the relay system 2*b* is specified as a relay system for receiving the resources. Upon receipt of the request, the delivering source system 1 delivers the specified resources to the relay system 2*b*. As a result, the resources specified by the request are to be stored in the relay system 2*b* before the mobile terminal system 3 (that is, the user) arrives at Osaka. Therefore, the mobile terminal system 3 (that is, the user) can immediately receive the specified resources if it is connected to the relay system 2*b* when it arrives at Osaka.

FIG. 2 shows the entire configuration of the resource delivering system according to another embodiment of the present invention. In this resource delivering system, the relay system 2 is connected one-to-one to the mobile terminal system 3. The relay system 2 is connected to the mobile terminal system 3 through, for example, a cable, or using an electromagnetic wave such as infrared radiation, etc. The mobile terminal system 3 can access the delivering source system 1 through any of the relay systems 2*a* through 2*c*, and can receive resources through any of the relay systems 2*a* through 2*c*.

Figure 3:
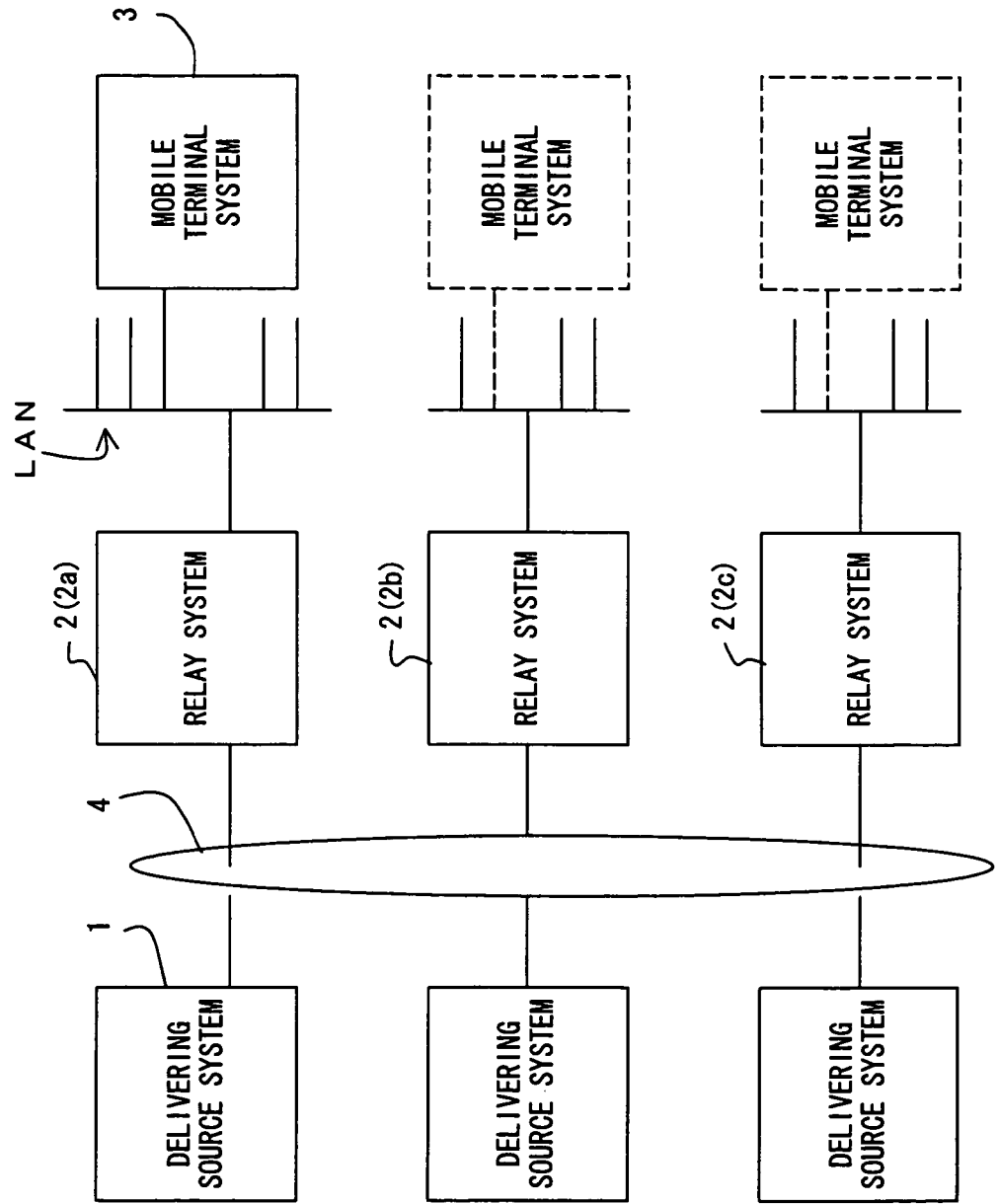
FIG. 3 shows the entire configuration of the resources delivering system according to a further embodiment of the present invention.

FIG. 3 shows the entire configuration of the resource delivering system according to a further embodiment of the present invention. In this resource delivering system, the mobile terminal system 3 can be connected to the relay system 2 through, for example, a LAN (including a radio LAN). Also in this case, the mobile terminal system 3 can access the delivering source system 1 through any of the relay systems 2*a* through 2*c*, and receive resources through any of the relay systems 2*a* through 2*c*.

FIG. 4 shows the configuration (block diagrams of the functions) of the delivering system. The delivering system delivers specified resources or predetermined resources to a specified relay system according to a request message, etc. from a mobile terminal system or a relay system. At this time, control information is assigned to delivered resources. Hereinafter, the resources assigned the control information may be referred to as "delivered data".

A communications control unit 11 transmits data to a network at an instruction from a data transfer unit 13, a management unit 14, etc., and receives data from a network. A message processing unit 12 is provided above the communications control unit 11, analyzes a request message from a mobile terminal system or a relay system, and transmits the result to the management unit 14. The request message contains, for example, information specifying resources to be delivered, information identifying a relay system for receiving the resources, information specifying the method of delivering resources, etc. The data transfer unit 13 is provided above the communications control unit 11, and generates data with a format which can be acceoted by a network from the resources to be delivered at an instruction from the management unit 14. Then, the data transfer unit 13 gives a transfer instruction.

The management unit 14 is provided above the message processing unit 12 and the data transfer unit 13. Upon receipt of a request message, according to predetermined information, or at an instruction input from the user of the resource delivering system, the management unit 14 generates and manages a resources delivering management list. The list is used for management of, at least, the information identifying resources to be delivered, and the information specifying a relay system for receiving the resources. Furthermore, the list is stored in an external storage device (for example, a hard disk) 17 when a delivering source system stops, and is loaded onto a temporary storage device (memory) 16 when the delivering source system is activated. The management unit 14 gives to the data transfer unit 13 an instruction to deliver resources.

At the instruction from the management unit 14, a data storage unit 15 retrieves the resources from the external storage device 17, and transmits them to the management unit 14. The external storage device 17 stores a resources delivering management list as described above, and stores the resources to be delivered to a mobile terminal system.

FIG. 5 shows the configuration (block diagram of the functions) of a relay system. The relay system receives resources from a delivering source system, and stores them. At a request from the mobile terminal system, the relay system delivers the resources. In addition, the relay system can obtain resources at a request from the mobile terminal system. The configuration and operations of the relay system are basically the same as the delivering source system except the following points.

Upon receipt of a request message issued from a mobile terminal system and a delivering completion notification message from another relay system, a message processing unit 22 analyzes and passes them to a management unit 24. At an instruction from the management unit 24, the message processing unit 22 transmits a request message to a delivering source system, generates a delivering completion notification message, and transmits it to another relay system.

Upon receipt of delivered data (resources+control information) from the delivering source system, the management unit 24 generates a resources delivering management list according to the control information, and manages the list. The list manages at least information identifying resources to be delivered, and information specifying a mobile terminal system to which the resources are to be delivered. The list is stored in an external storage device 27 when a relay system is stopped, and is loaded onto a temporary storage device 26 when the relay system is activated. Furthermore, the management unit 24 stores the received resources in the external storage device 27.

Then, according to the above mentioned list, or the request from the mobile terminal system, the management unit 24 provides a data transfer unit 23 with an instruction to transmit the resources received from the delivering source system to the mobile terminal system. Furthermore, when a predetermined condition is satisfied, the management unit 24 transmits to the message processing unit 22 an instruction to transmit a delivering completion notification message to another relay system.

The operations of a communications control unit 21, the data transfer unit 23, and a data storage unit 25 are basically the same as those of the communications control unit 11, the data transfer unit 13, and the data storage unit 15 described by referring to FIG. 4. Therefore, the detailed explanation is omitted here.

FIG. 6 shows the configuration (block diagram of the functions) of a mobile terminal system. The mobile terminal system receives desired resources from a relay system by transmitting a request message to a delivering source system or a relay system, or transmitting a connection message to a relay system. The configuration and operations of the mobile terminal system are basically the same as those of the delivering source system or the relay system except the following points.

A message processing unit 32 generates a request message to a delivering source system or a relay system, or a connection message to a relay system at an instruction from a management unit 34, and transmits it to the relay system.

A data reception unit 33 is connected to a relay system at an instruction from the management unit 34, and receives resources. Upon receipt of the resources, the data reception unit 33 notifies the management unit 34 of the receipt.

The management unit 34 instructs the message process unit 32 to transmit a request message to a delivering source system or a relay system, and a connection message to a relay system at a user instruction input from an input/output device (for example, a keyboard, a mouse, a speech recognition device, etc.) 38, or according to the instruction information entered in an external storage device 37. In addition, an instruction to store the resources received by the data reception unit 33 in the external storage device 37 is issued to a data storage unit 35. The data storage unit 35 stores the received resources in the external storage device 37.

Since the operations of a communications control unit 31 are basically the same as those of the communications control unit 11 explained by referring to FIG. 4, the explanation is omitted here.

Described below is resource delivering sequence.

FIG. 7 shows a first example of resource delivering sequence. In the resource delivering process shown in FIG. 7, a mobile terminal system specifies resources to be delivered, a relay system for receiving the resources, and a method for delivering the resources. In this example, a mobile terminal 61 receives resources from a delivering source system 41 through a relay system 51. The sequence is performed in, for example, an on-demand resource delivering process.

Figure 8:
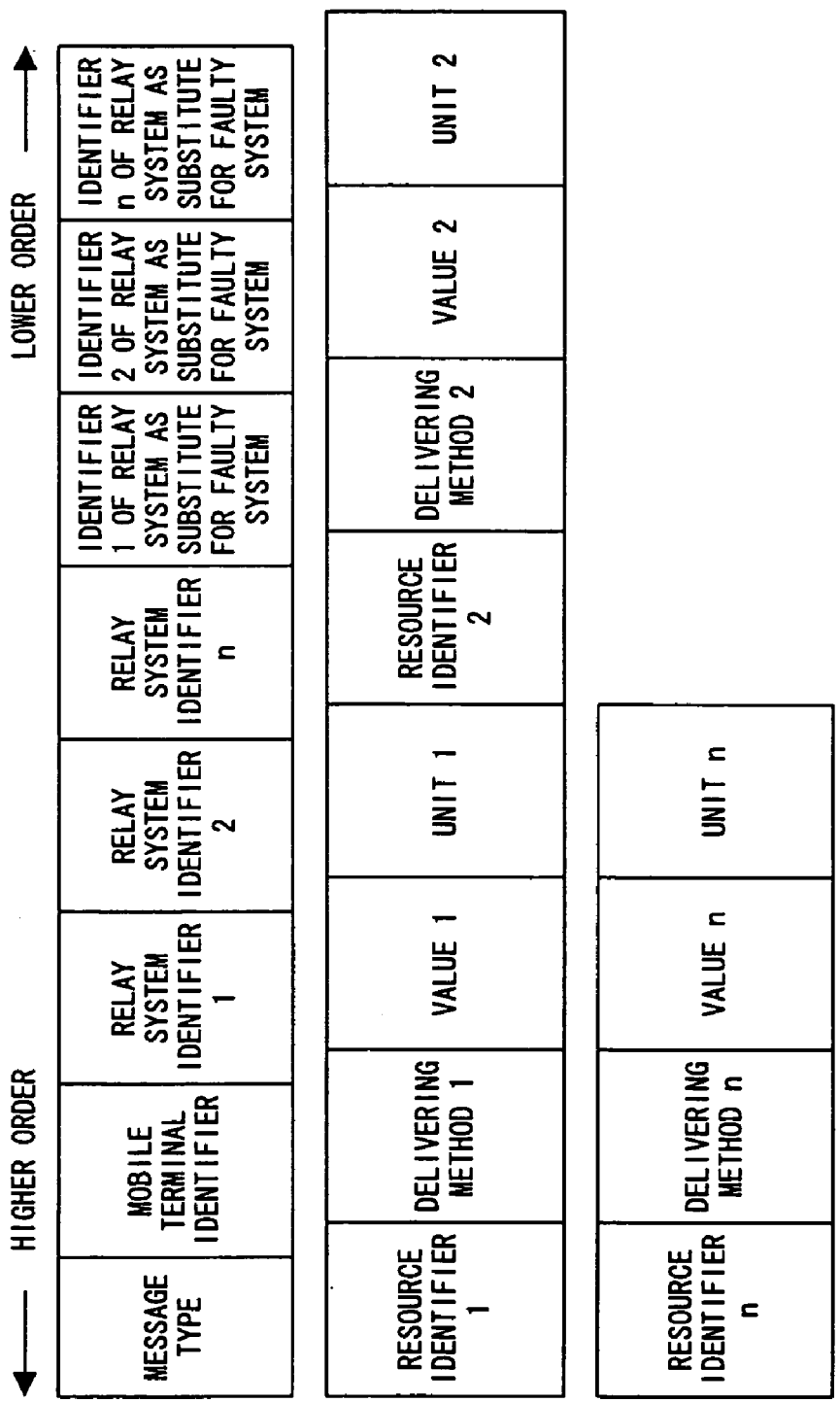
FIG. 8 shows an example of a request message.

The mobile terminal 61 generates a request message according to the information input from the input/output device 38, or the information stored in the external storage device 37, and transmits it to the delivering source system 41. FIG. 8 shows an example of a request message.

As shown in FIG. 8, a request message comprises "message type", "mobile terminal identifier", "relay system identifier", "substitute relay system identifier", "resource identifier", "delivering method information", "value information", and "unit information".

A message type identifies the type of message. In addition to a request message, the resource delivering system uses at least a connection message, a delivering completion notification message, and a non-delivering notification message. When resources are delivered from a delivering source system to a mobile terminal system, they are transmitted as being stored in a message or added to a message.

A mobile terminal identifier identifies a mobile terminal system which has issued a request message. In the example shown in FIG. 7, the information identifying the mobile terminal 61 is set. A relay system identifier identifies a relay system for receiving resources. In the example shown in FIG. 7, the information identifying the relay system 51 is set. It is also possible to set a plurality of relay system identifiers in one request message. A substitute relay system identifier identifies a relay system for receiving resources transmitted from a delivering source system instead of a relay system identified by a relay system identifier, when that relay system becomes faulty. In the example shown in FIG. 7, nothing is set in the substitute relay system identifier.

A resource identifier identifies desired resources to be received by the mobile terminal system from the delivering source system. It is also possible to set a plurality of resource identifiers in one request message. Delivering method information is set for each resource identifier, and specifies a method of delivering corresponding resources. In the embodiment, a method of delivering resources can be optionally selected from among immediate delivery, later delivery, and periodical delivery. A set of value information and unit information is set for each resource identifier, and the delivering cycle is specified when the periodical delivery is selected as delivering method information. For example, "at nine in the morning every day", "on the 25th day in each month", etc. can be specified.

A request message transmitted from the mobile terminal 61 is transferred to the delivering source system 41. At this time, the message can be transferred to the delivering source system 41 through the relay system 51, or can be transferred to the delivering source system 41 without the relay system 51.

Figure 9:
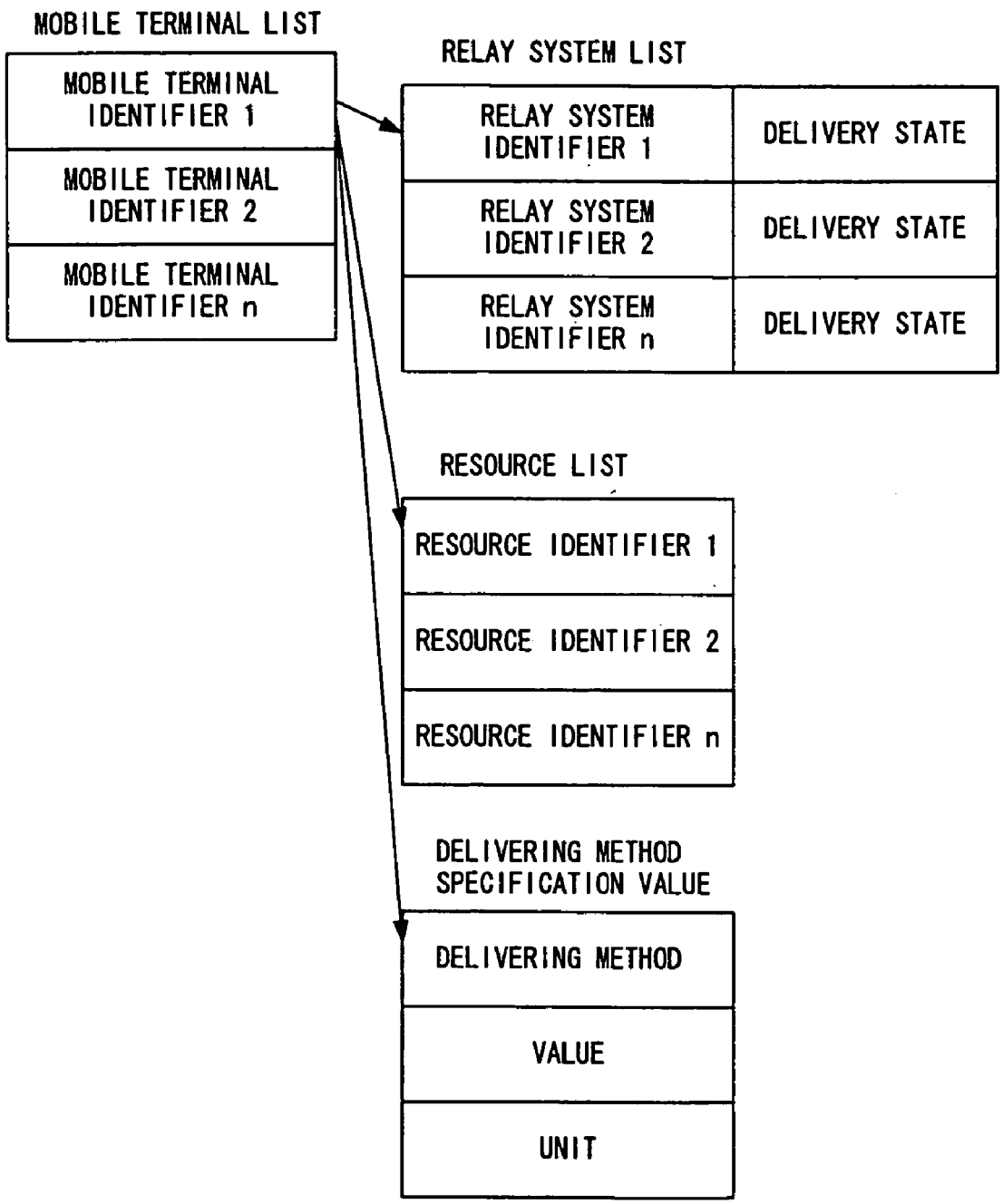
FIG. 9 shows an example of a resource delivering management list provided in the delivering source system.

The delivering source system 41 recognizes the resources requested by the mobile terminal 61, the relay system for delivering the resources, the resource delivering method, etc. by analyzing the received request message. Then, the delivering source system 41 generates (or updates) a resource delivering management list. FIG. 9 shows an example of a resource delivering management list provided in a delivering source system.

A resource delivering management list provided in a delivering source system contains a relay system identifier, a resource identifier, and a delivering method specification value (delivering method, etc.) entered in a request message using the mobile terminal identifier set in the request message as a key. When a delivering method, etc. is set for each resource identifier as the request message shown in FIG. 8, a delivering method specification value can be entered using a resource identifier as a key in a resource delivering management list. When a substitute relay system identifier is set in a request message although not shown in FIG. 9, the identifier is also entered in the resource delivering management list.

Figure 10:
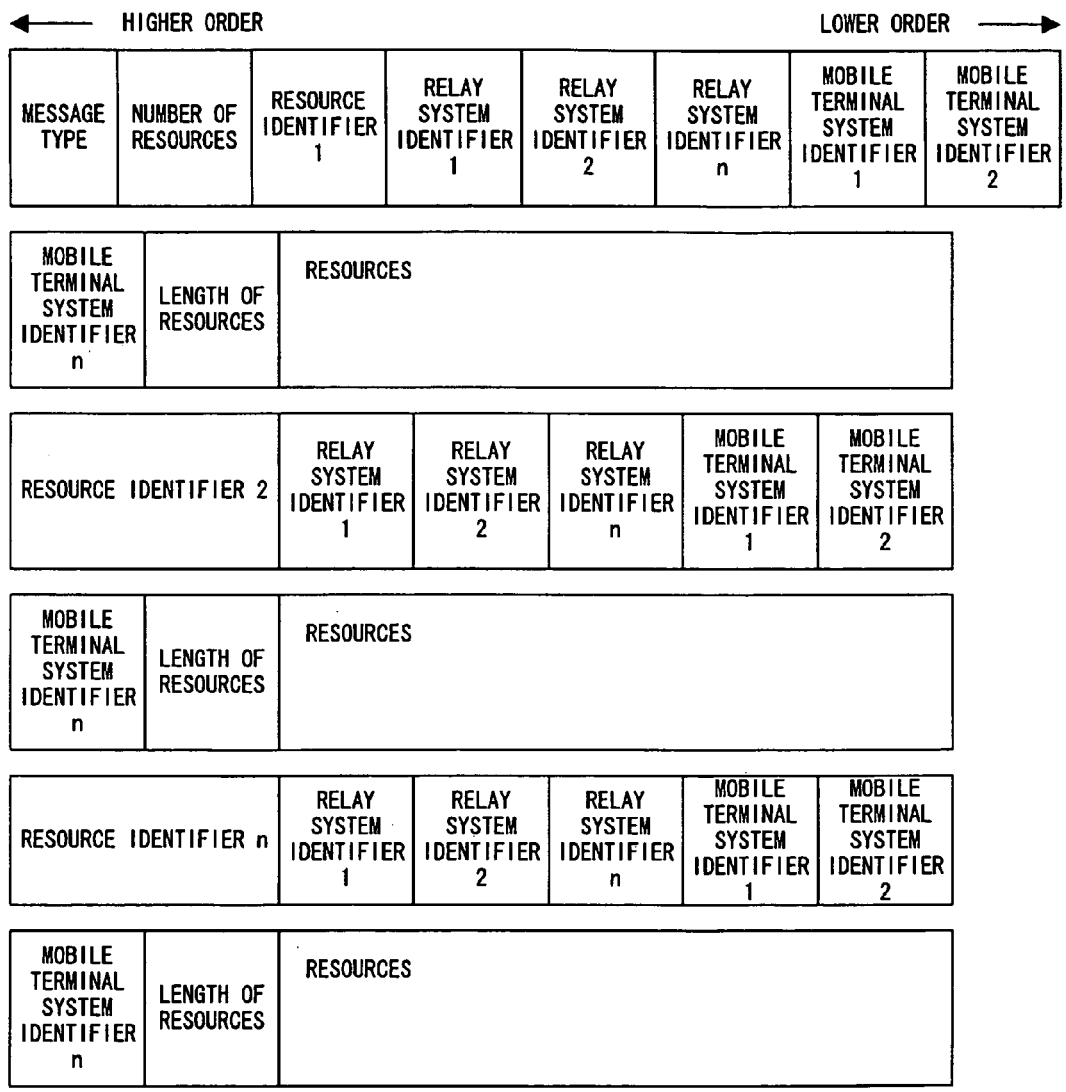
FIG. 10 shows an example of a message used to deliver resources.

When the delivering source system 41 generates a resource delivering management list, it delivers resources according to the list. When the "immediate delivering" is entered as a delivering method, the delivering source system 41 immediately delivers the requested resources to the mobile terminal 61. When the "later delivery" is entered, it immediately delivers the requested resources to the relay system 51. When the "periodical delivery" is entered, it delivers the requested resources to the relay system 51 if a specified time has passed. The resources are obtained according to the resource delivering management list. Furthermore, the resources are delivered as being stored in a message (or as added to the message). FIG. 10 shows an example of a message storing resources (or a resource attached message).

In FIG. 10, the "message type" contains a value corresponding to the "resource delivering". The "number of resources" refers to the number of resources to be delivered to a mobile terminal system or are lay system. The "resource identifier" identifies the resources to be delivered. The "relay system identifier" identifies a relay system for receiving the resources. The "mobile terminal identifier" identifies a mobile terminal system for receiving the resources. For example, in the resource delivering shown in FIG. 7, the "relay system identifier=relay system 51" and "mobile terminal identifier=mobile terminal 61" are set. The "resource length" refers to the data length of the resources to be delivered. The "relay system identifier", "mobile terminal identifier", and "resource length" are set for each "resource identifier".

When the "immediate delivery" is entered as a resource delivering method, the delivering source system 41 delivers the requested resources to the mobile terminal 61. At this time, the resources can be delivered directly to the mobile terminal 61 without the relay system 51, or can be delivered through the relay system 51. When the resources are delivered to the mobile terminal 61 through the relay system 51, the relay system 51 transfers the resources to the mobile terminal 61 without storing the resources in a storage device in the relay system 51, if it recognizes that the destination address of the message storing the resources is the mobile terminal 61.

When the "later delivery" or the "periodical delivering" is entered as a resource delivering method, the delivering source system 41 delivers the requested resources to the relay system 51. When the relay system 51 recognizes that the destination address of the message storing the resources is the relay system 51, it stores the resources in the storage device (for example, the external storage device 27 shown in FIG. 5) provided by the relay system 51. Then, the relay system 51 awaits the connection from the mobile terminal 61.

Figure 11A:
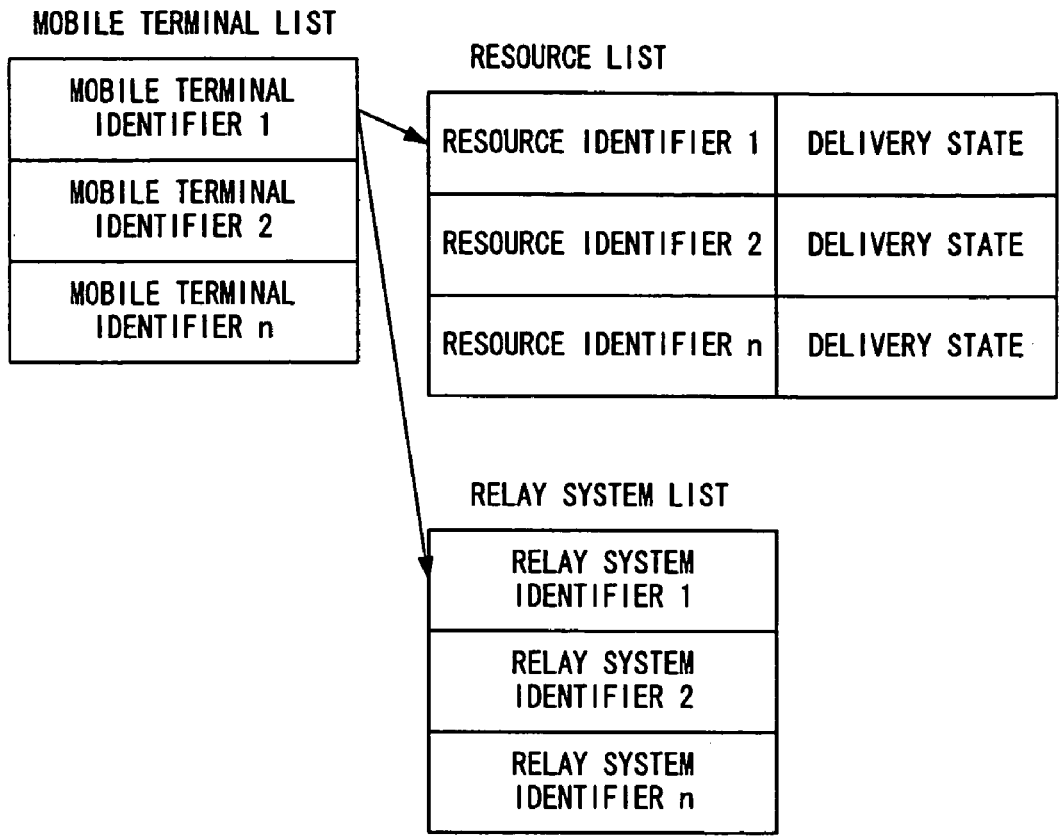
FIG. 11A shows an example of a resource delivering management list provided in the relay system.

The relay system 51 recognizes the resources transmitted from the delivering source system 41, the mobile terminal system for receiving the resources, and other relay system receiving the same resources. Then, the relay system 51 generates (or updates) a resource delivering management list. FIG. 11A shows an example of the resource delivering management list provided in the relay system.

As shown in FIG. 11A, the resource delivering management list provided in the relay system contains a resource identifier and a relay system identifier using a mobile terminal identifier as a key. The resource identifier, the relay system identifier, and the mobile terminal identifier are obtained from a message from the delivering source system.

Figure 12:
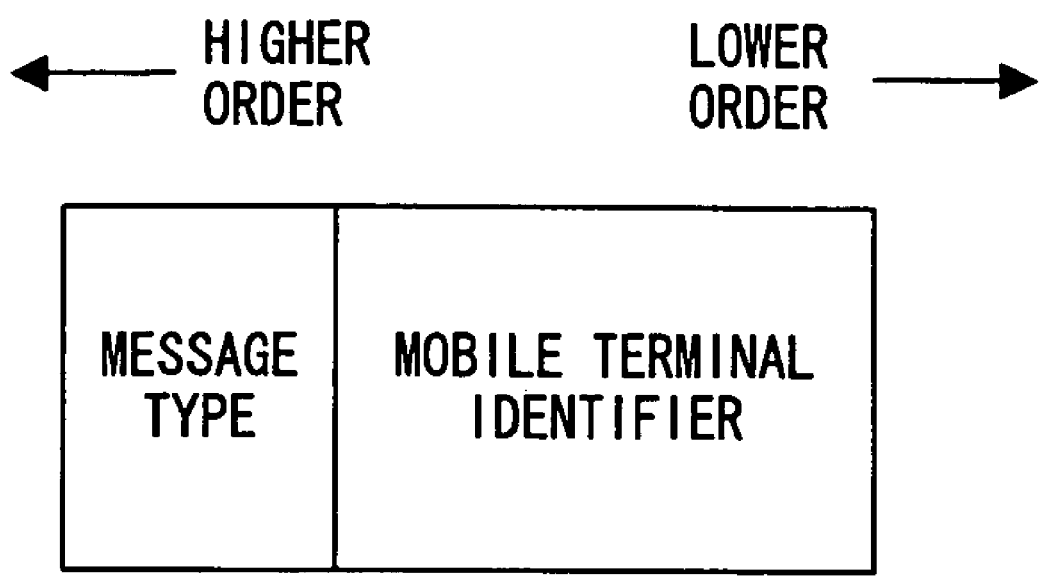
FIG. 12 shows an example of a connection message.

The mobile terminal 61 is connected to the relay system 51 to receive resources from the relay system 51 when the "later delivery" or "periodical delivery" is specified. FIG. 12 shows an example of a message used at this time. In the "message type" in the message, a value corresponding to the "connection (transfer request)" is set. The "mobile terminal identifier" identifies the mobile terminal system which has issued the message. For example, in the example shown in FIG. 7, the "mobile terminal identifier=mobile terminal 61" is set.

Figure 13:
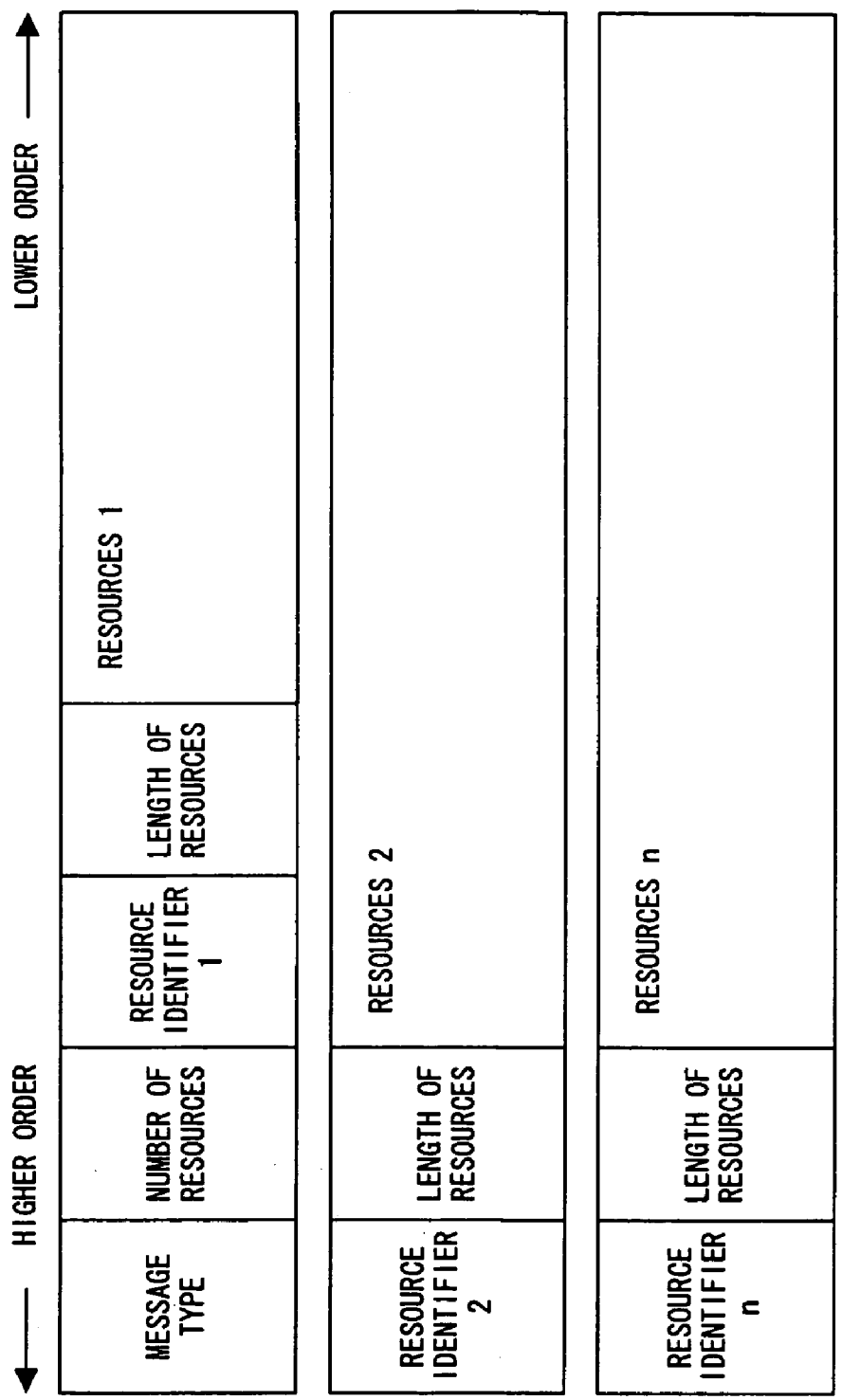
FIG. 13 shows an example of a data format used when resources are delivered from the relay system to a mobile terminal.

Upon receipt of the connection message from the mobile terminal 61, the relay system 51 accesses the list shown in FIG. 11A using the mobile terminal identifier set in the message as a key, and recognizes the resources to be delivered. Then, it retrieves the corresponding resources from the external storage device 27, and delivers them to the mobile terminal 61. FIG. 13 shows an example of a data format used when resources are delivered from a relay system to a mobile terminal.

Figure 14:
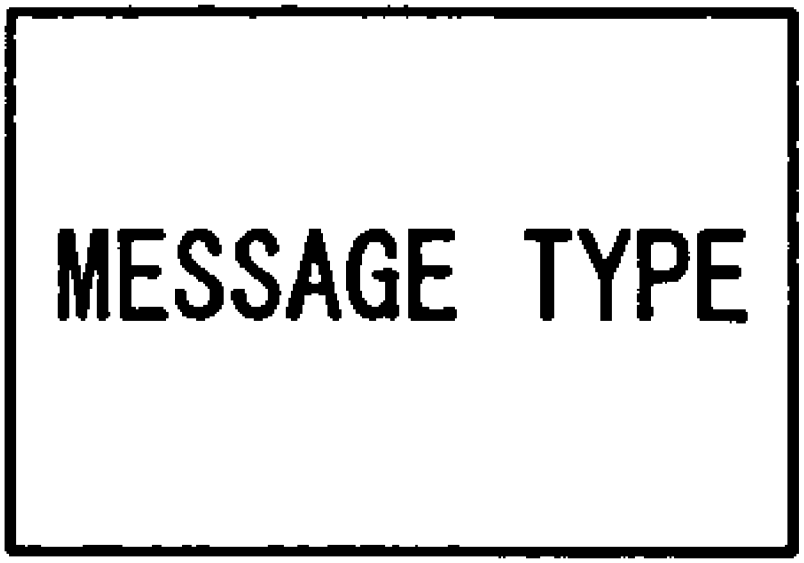
FIG. 14 shows an example of a non-delivering notification message.

The mobile terminal 61 stores the resources received from the relay system 51 in a storage device (for example, the external storage device 37 shown in FIG. 6). The mobile terminal 61 transmits a non-delivering notification message shown in FIG. 14 to the relay system 51 when it cannot receive resources within a predetermined time after the above mentioned connection message has been transmitted.

When the relay system 51 does not receive a non-delivering notification message within a predetermined time after having transmitted resources to the mobile terminal 61, it assumes that the resources have been received by the mobile terminal 61, and deletes the resources from the external storage device 27. However, when it receives a non-delivering notification message, it transmits the resources to the mobile terminal 61 on more time.

In the above mentioned resource delivering, if "later delivery" or "periodical delivery" is selected as a resource delivering method, the mobile terminal 61 immediately disconnects the line between the mobile terminal 61 and the delivering source system 41 (or the line between the mobile terminal 61 and the relay system 51), after issuing a request message to the delivering source system 41. Then, the mobile terminal 61 accesses the relay system 51 when it assumes that desired resources have been delivered from the delivering source system 41 to the relay system 51. Therefore, during the period in which resources are delivered from the delivering source system 41 to the relay system 51, the line between the mobile terminal system 61 and the delivering source system 41 (or the line between the mobile terminal 61 and the relay system 51) is disconnected. As a result, no wasteful costs arise.

Figure 15:
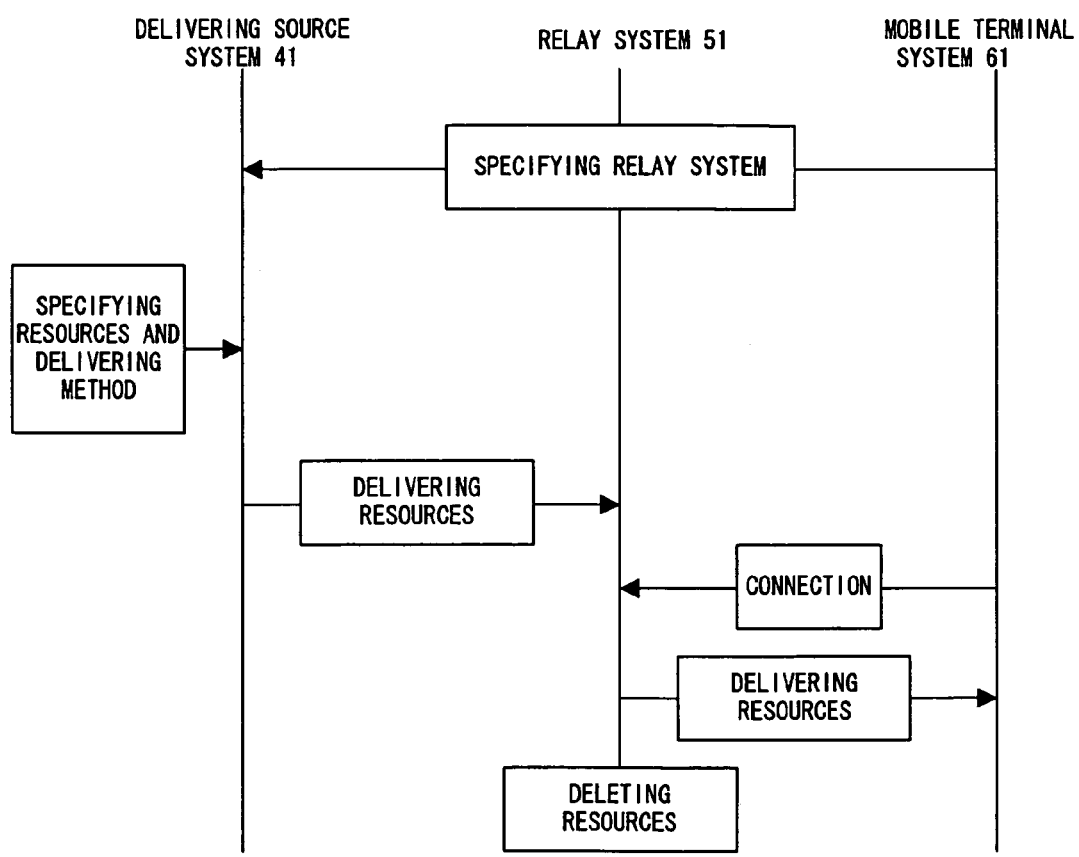
FIG. 15 shows a second example of resource delivering sequence.

FIG. 15 shows a second example of resource delivering sequence. In the resource delivering sequence shown in FIG. 15, the delivering source system specifies resources to be delivered and a method for delivering the resources, and the mobile terminal system specifies only the relay system for receiving the resources. The sequence is performed in, for example, push-type resource delivering system. A push-type resource delivering system can be, for example, a system of delivering newspaper data to a subscriber, a system of delivering a software program to a member of a company employees, etc.

The mobile terminal 61 first generates a request message, and transmits it to the delivering source system 41. In this case, the request message contains a "mobile terminal identifier", and a "relay system identifier", but does not contain a "resource identifier", "delivering method information", etc.

The delivering source system 41 has a resource delivering management list in advance as shown in FIG. 9. All relay systems are entered as default in the relay system list in the resource delivering management list. In the example shown in FIG. 15, the resource delivering management list is generated by, for example, a user of the resource delivering system.

Upon receipt of a request message from the mobile terminal 61, the delivering source system 41 accesses the resource delivering management list using the "mobile terminal identifier" set in the message as a key, and recognizes the resources to be delivered. Then, it obtains the resources from the external storage device 17. When the "immediate delivery" is entered as a resource delivering method in the resource delivering management list, the delivering source system 41 delivers the resources to the mobile terminal 61. When the "later delivery" or the "periodical delivering" is entered as a resource delivering method, the delivering source system 41 delivers the resources to the relay system specified by the request message. If no relay system is specified in the above mentioned request message, the resources are delivered to all relay systems according to the default of the resource delivering management list. The resource delivering method follows the resource delivering management list. FIG. 15 shows an example of the "periodical delivery".

Since the subsequent process sequence is basically the same as those shown in FIG. 7, the detailed explanation is omitted here.

Figure 16:
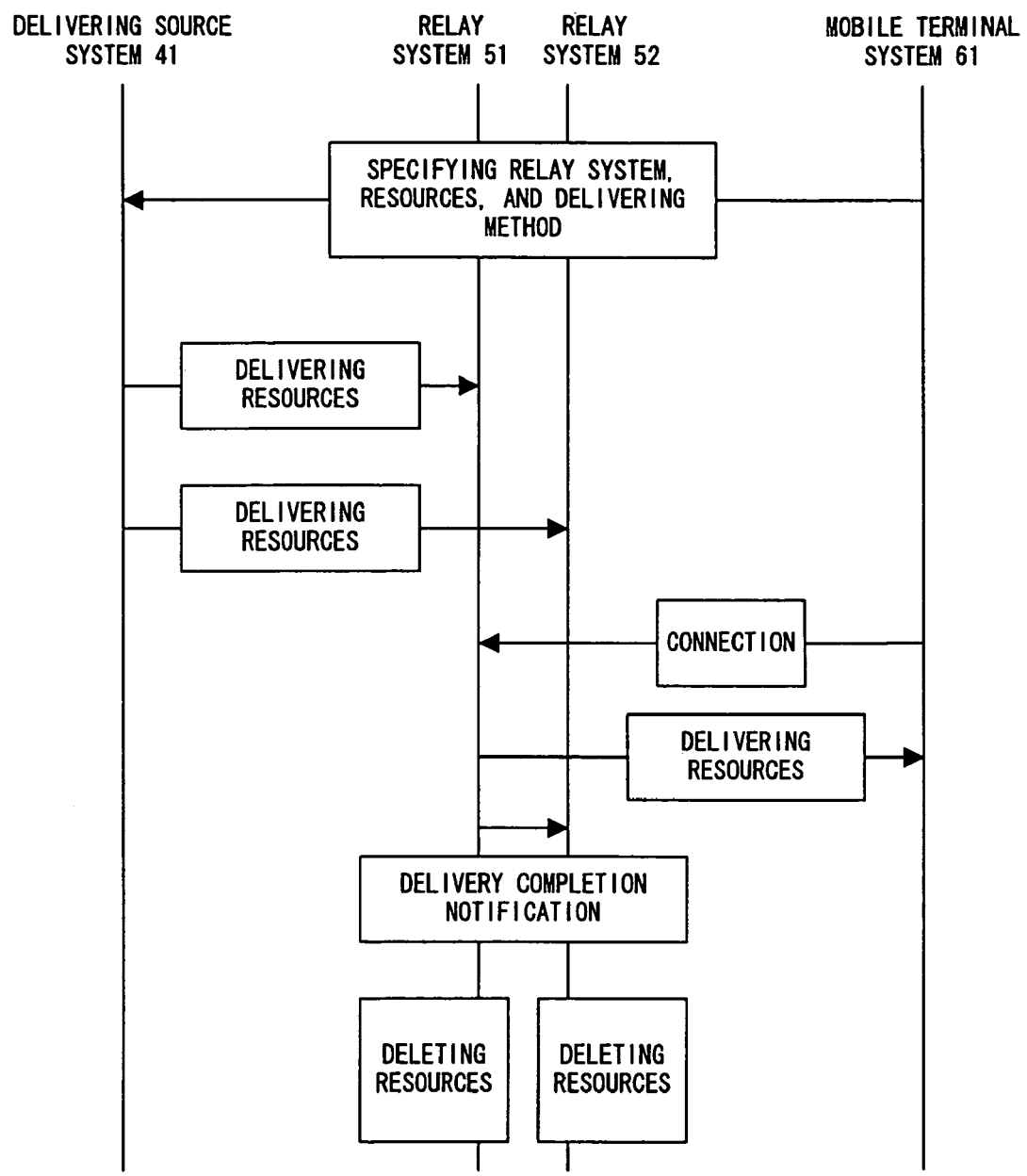
FIG. 16 shows a third example of resource delivering sequence.

FIG. 16 shows a third example of resource delivering sequence. The resource delivering sequence shown in FIG. 16 is basically the same as that shown in FIG. 7, but a plurality of relay systems are specified in this sequence.

In this case, the mobile terminal 61 first generates a request message specifying a plurality of relay systems (relay systems 51 and 52) for receiving resources, and transmits the message to the delivering source system 41. Then, upon receipt of the request message, the delivering source system 41 delivers the resources specified by the message to the relay systems 51 and 52. Then, the mobile terminal 61 can receive the resources by being connected to the relay system 51 or 52.

Upon completion of the resource delivering to the mobile terminal 61, the relay system 51 refers to the resource delivering management list to search for a relay system storing the same resources as the resources which has been delivered to the mobile terminal 61. At this time, the resource delivering management list provided in the relay system is generated as follows. That is to say, when the delivering source system delivers the same resources to a plurality of relay systems, it notifies each of the relay systems of the relay systems receiving the same resources using the message shown in FIG. 10. Each of the relay systems enters the relay systems receiving the same resources in the relay system list in the resource delivering management list shown in FIG. 11A according to each notification.

Figure 17:
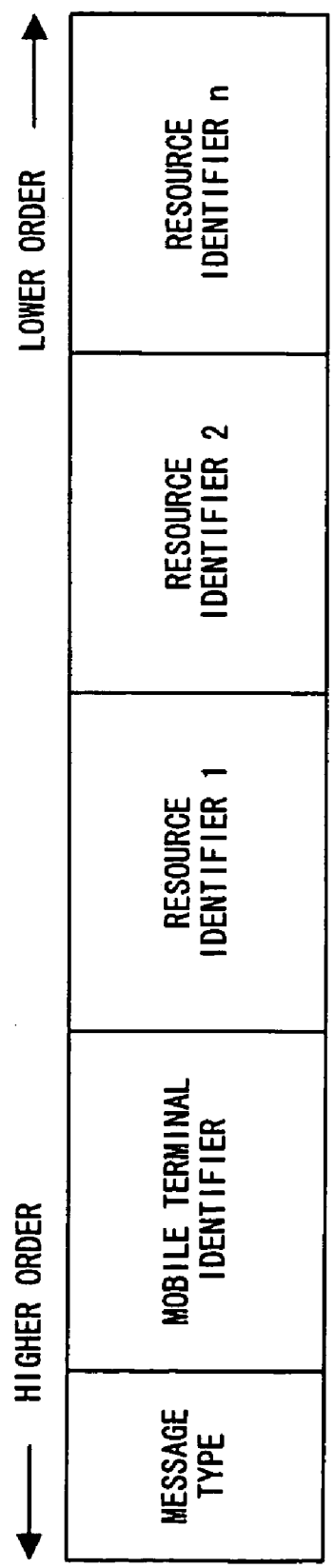
FIG. 17 shows an example of a delivering completion notification message.

When the relay system 51 retrieves a relay system which stores the same resources as those delivered to the mobile terminal 61, it transmits the delivering completion notification message shown in FIG. 17 to the retrieved relay system. Thus, the delivering completion notification message is transmitted from the relay system 51 to the relay system 52.

When the relay system 51 transmits the delivering completion notification message to the relay system 52, it deletes the resources which have been delivered to the mobile terminal system 61 from the external storage device 27 in the relay system 51. Furthermore, upon receipt of the delivering completion notification message, the relay system 52 deletes the same resources from the external storage device provided for the relay system 52. Thus, unnecessary resources are deleted in all relay systems related to the resource delivering.

In the example shown in FIG. 16, the same resources are delivered to two relay systems. However, when the same resources are delivered to three or more relay systems, the relay system which has delivered the resources to a mobile terminal system notifies all other relay systems storing the same resources of the delivering completion notification message. For example, when the same resources are delivered to the relay systems A, B, and C, and a mobile system receives the resources from the relay system A, the relay system A transmits a delivering completion notification message to the relay systems B and C.

Thus, in the resource delivering shown in FIG. 16, the mobile terminal system can specify a plurality of relay systems for receiving resources. Therefore, the mobile terminal systems can receive desired resources from any relay system in the plurality of relay systems. For example, when a user of the mobile terminal system transmits to a delivering source system a request message specifying the relay system provided in Tokyo Head Office and the relay system provided in Osaka Branch Office, the resources specified by the message are delivered to the relay systems provided in Tokyo Head Office and Osaka Branch Office. Therefore, the user of the mobile terminal system can obtain the resources from the relay system provided in Tokyo Head Office, or obtain the resources from the relay system provided in Osaka Branch Office after having moved to Osaka. When the user arrives at Osaka Branch Office, the resources have already been stored in the relay system in Osaka Branch Office. Therefore, the user can immediately obtain the resources when he or she arrives at Osaka Head Office.

Figure 18:
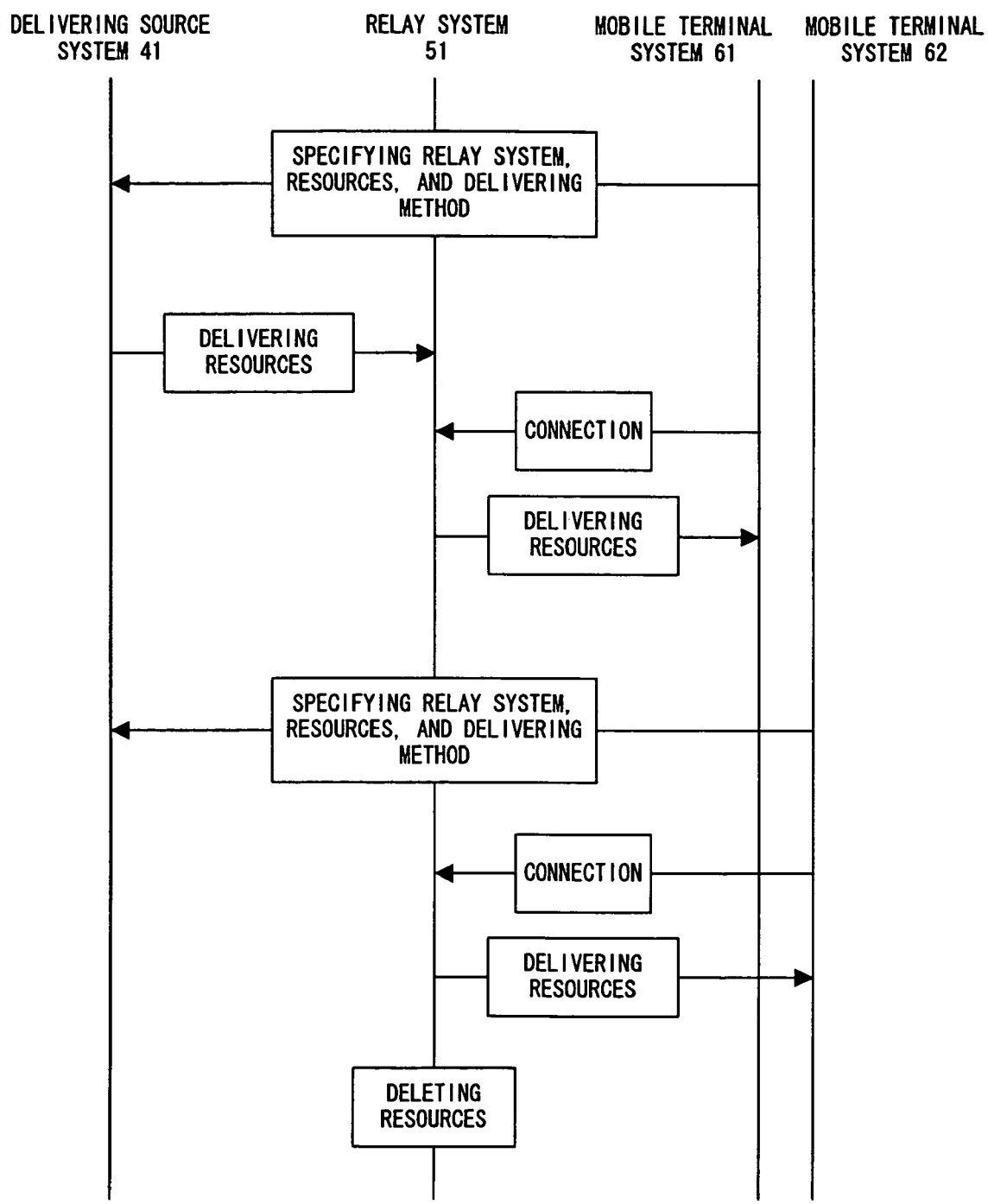
FIG. 18 shows a fourth example of resource delivering sequence.

FIG. 18 shows a fourth example of resource delivering sequence. In the resource delivering sequence shown in FIG. 18, a plurality of mobile terminal systems request the same resources. This type of resource delivering can be, for example, a case in which a plurality of employees download respective application programs from an application server and use them.

Figure 11B:
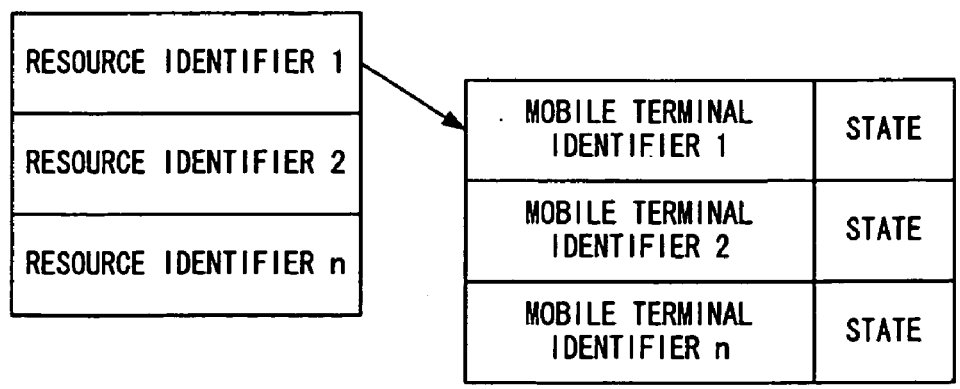
FIG. 11B shows an example of a mobile terminal management list.

In this embodiment, it is assumed that the mobile terminal systems 61 and 62 receive resources through the relay system 51. In this case, the relay system 51 is provided with the mobile terminal management list shown in FIG. 11B. In the mobile terminal management list, a mobile terminal system to which resources are to be delivered is entered for each of the resources. In the example shown in FIG. 18, it is assumed that mobile terminal systems 61 and 62 are entered in the mobile terminal management list. The mobile terminal management list is entered in advance by, for example, a user of the resource delivering system.

In the resource delivering shown in FIG. 18, the mobile terminal 61 first notifies the delivering source system 41 of the request message in which there lay system 51 is specified as a relay system for receiving resources. Upon receipt of the request message, the delivering system 41 generates a resource delivering management list according to the message, and delivers the resources specified by the message to the relay system 51. Subsequently, the delivering source system 41 does not deliver the resources specified by the request message although it receives the request message in which the same resources and the same relay system are specified. Whether or not the same resources and the same relay system are specified in the received request message is determined by referring to the resource delivering management list of the delivering source system.

The relay system 51 stores the resources delivered from the delivering source system 41 in the external storage device 27. In the mobile terminal management list of the relay system 51, the mobile terminal systems 61 and 62 are entered as the mobile terminal systems to which the resources are to be delivered as described above.

In the above mentioned state, the mobile terminal system 61 receives the resources from the relay system 51 by being connected to the relay system 51. At this time, in the relay system 51, the status flag corresponding to the mobile terminal 61 in the mobile terminal management list is updated from "not delivered" to "delivered". Here, it is assumed that the status flag corresponding the mobile terminal system 62 is set to "not delivered".

The mobile terminal system 62 notifies the delivering source system 41 of the request message in which the relay system 51 is specified as a relay system for receiving resources. The resources specified in the message are assumed to be the same as the resources specified in the request message from the mobile terminal system 61. In this case, since the delivering source system 41 has processed a request message in which the same resources and the same relay system are specified in advance, it does not deliver resources when it receives a message from the mobile terminal system 62. Then, the mobile terminal system 62 expects that the resources have been delivered from the delivering source system 41 to the relay system 51 according to the above mentioned request message, then it is connected to the relay system 51 to receive the above mentioned resources.

When the relay system 51 delivers the resources to the mobile terminal system 62, it updates the status flag corresponding to the mobile terminal system 62 in the mobile terminal management list from "not delivered" to "delivered". Thus, each of the status flags corresponding to all mobile terminal systems entered in the mobile terminal management list is set to "delivered". When the relay system 51 confirms this, it deletes the resources delivered to the mobile terminal systems 61 and 62 from the external storage device 27.

In the resource delivering, when a plurality of mobile terminal systems request the same resources, the resource delivering from a delivering source system to a relay system is not performed repeatedly, thereby avoiding wasteful data transfer.

Figure 19:
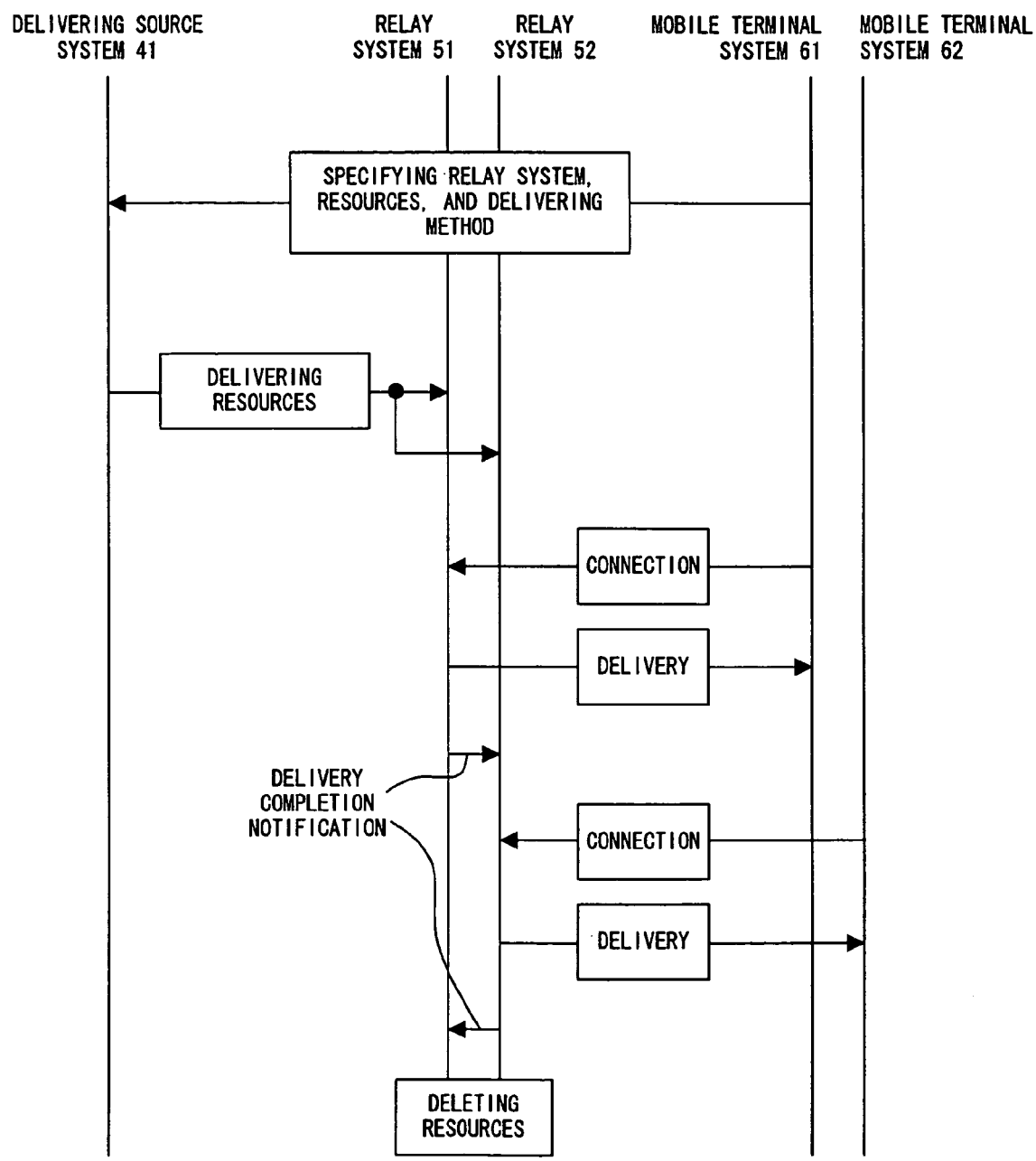
FIG. 19 shows a variation of the resource delivering sequence shown in FIG. 18.

FIG. 19 shows a variation of the resource delivering sequence shown in FIG. 18. In this sequence, the same resources are delivered from a delivering source system to a plurality of relay systems, and each mobile terminal system can receive the resources from any relay system in the plurality of relay systems.

That is, the delivering source system 41 delivers the same resources to the relay systems 51 and 52 at a request from a mobile terminal system. It is assumed that the relay systems 51 and 52 are provided with respective mobile terminal management lists. Each of the mobile terminal management lists provided in the relay systems 51 and 52 shows the status shown in FIG. 20A.

In this state, when the mobile terminal system 61 accesses the relay system 51, the relay system 51 delivers the resources to the mobile terminal system 61. At this time, the relay system 51 updates the mobile terminal management list into the status shown in FIG. 20B, and notifies the relay system 52 that the resources have completely been delivered to the mobile terminal system 61. Upon receipt of the notification, the relay system 52 updates the mobile terminal management list into the status shown in FIG. 20B. Thus, each of the mobile terminal management lists of all relay systems related in the resource delivering is updated into the status shown in FIG. 20B.

When the mobile terminal system 62 accesses the relay system 52, the relay system 52 delivers the resources to the mobile terminal system 62. At this time, the relay system 52 updates the mobile terminal management list into the status shown in FIG. 20C, and notifies the relay system 51 that the resources have completely been delivered to the mobile terminal system 62. Upon receipt of the notification, the relay system 51 updates the mobile terminal management list into the status shown in FIG. 20C. Thus, each of the mobile terminal management lists of all relay systems related in the resource delivering is updated into the status shown in FIG. 20C.

When the relay systems 51 and 52 detect that the statuses of all mobile terminal systems entered in the mobile terminal management list indicate "delivered", they discard the resources delivered to the mobile terminal systems.

When the same resources are delivered to a plurality of relay systems, the plurality of resources are delivered to the respective mobile terminal systems as synchronous with each other in delivering status, and unnecessary resources are discarded when the resources are delivered to all mobile terminals.

Figure 21:
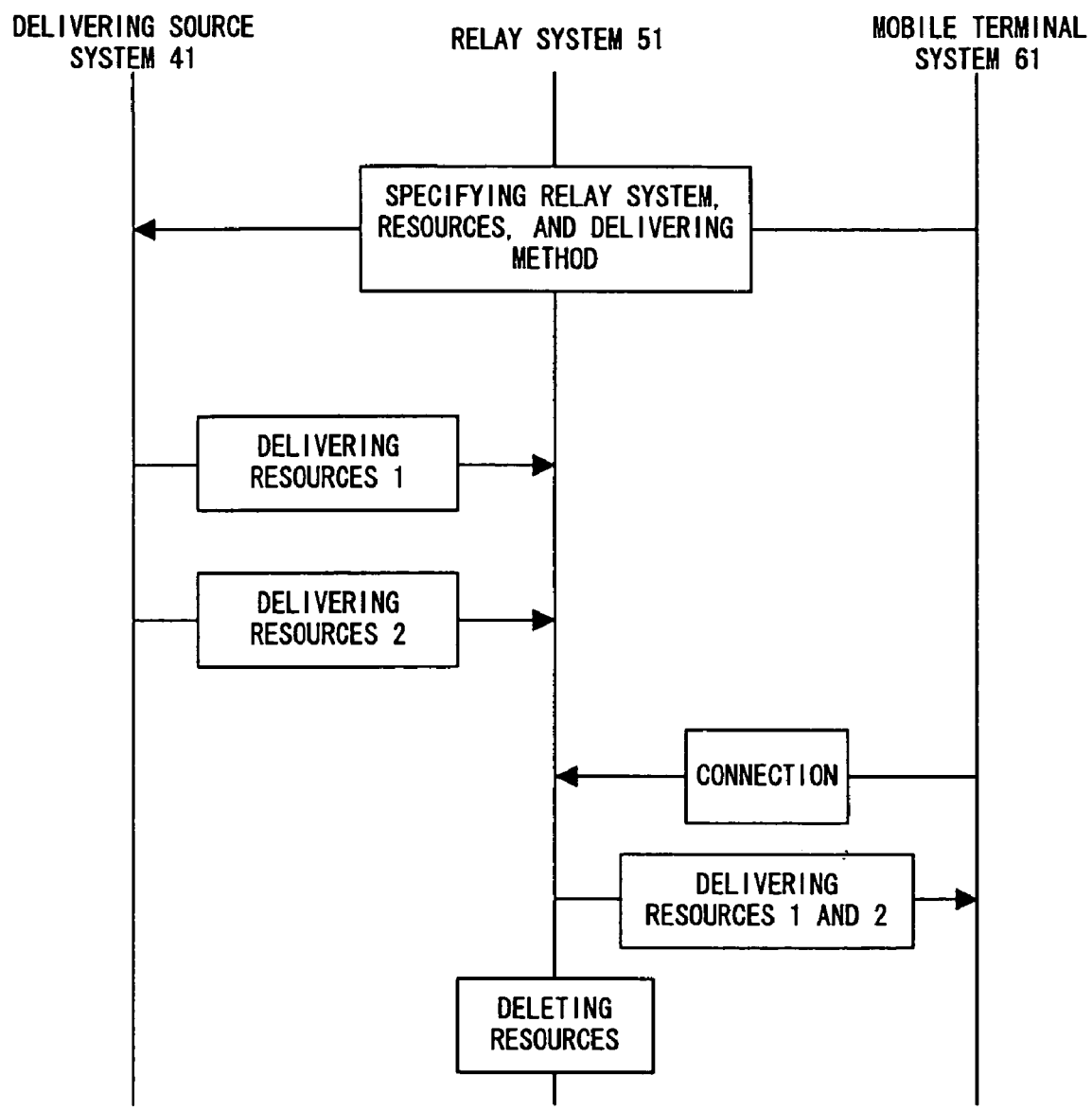
FIG. 21 shows a fifth example of resource delivering sequence.

FIG. 21 shows a fifth example of resource delivering sequence. In the resource delivering sequence shown in FIG. 21, resources are periodically delivered. This kind of resource delivering sequence is, for example, a newspaper subscription. In this case, newspaper data is delivered to a subscriber every morning.

In the resource delivering, the mobile terminal system 61 notifies the delivering source system 41 of the request message in which "periodical delivery" is specified as a delivering method. In this case, the intervals of the resource delivering are set using the "value information" and "unit information" shown in FIG. 8.

Upon receipt of the request message, the delivering source system 41 delivers resources according to the message. In this case, the resources are delivered to a relay system (the relay system 51) specified by the received request message. Then, the relay system 51 stores the resources in the external storage device 27.

The mobile terminal system 61 receives resources the by being connected to the relay system 51. If there are resources undelivered to the mobile terminal system 61, then the relay system 51 collectively delivers all the resources to the mobile terminal system 61. In the example shown in FIG. 21, resources 1 and resources 2 are delivered to the mobile terminal system 61. Then, the relay system 51 deletes from the external storage device 27 the resources already delivered to the mobile terminal system 61.

Thus, in the resource delivering shown in FIG. 21, the resources periodically delivered from a delivering source system are accumulated in a relay system. Therefore, if a mobile terminal system cannot temporarily receive resources for some reason, the mobile terminal system can collectively obtain the resources later from the relay system.

Figure 22:
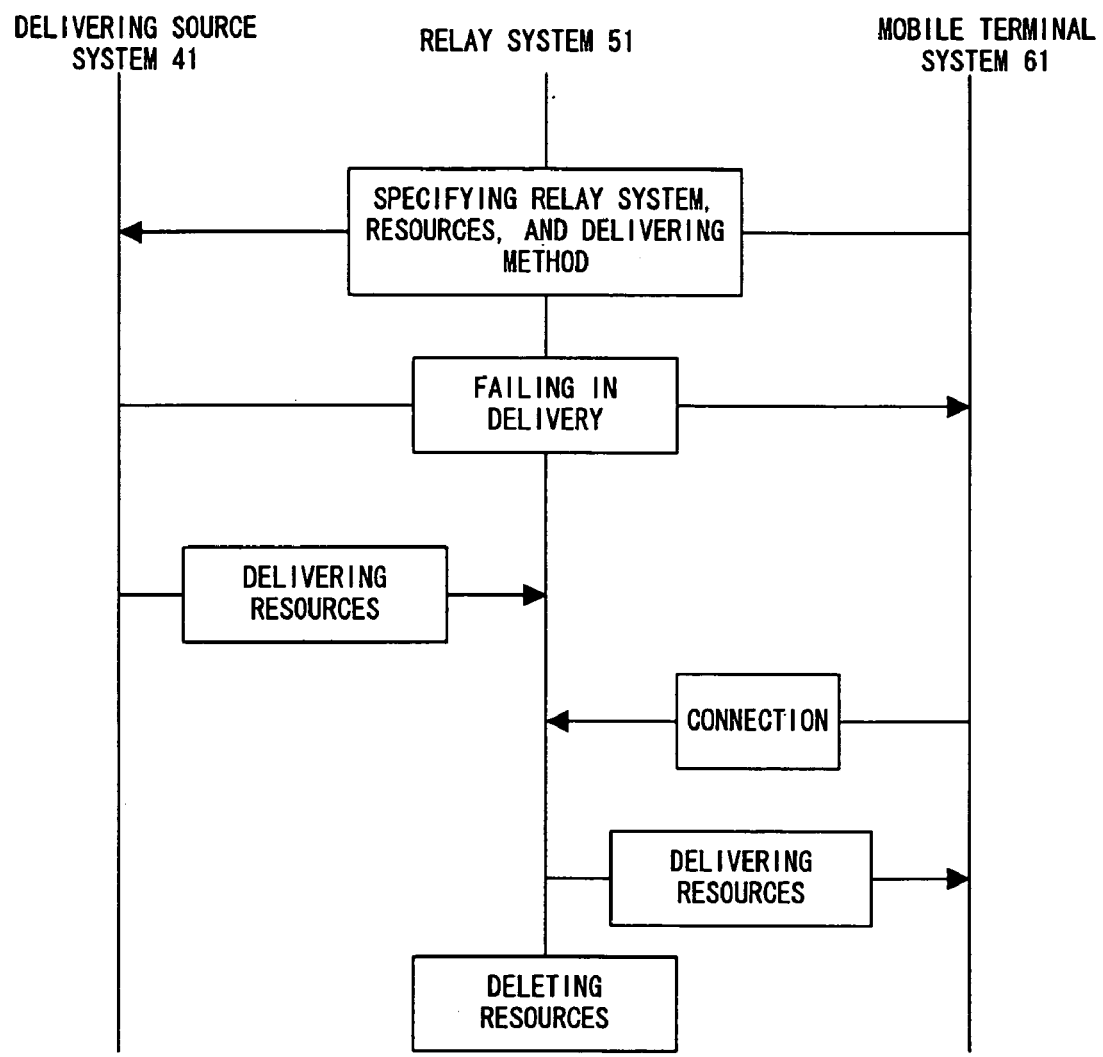
FIG. 22 shows a sixth example of resource delivering sequence.

FIG. 22 shows a sixth example of resource delivering sequence. In the resource delivering shown in FIG. 22, when resources are unsuccessfully delivered to a mobile terminal system, the delivering source system delivers the resources to a relay system.

The delivering source system 41 delivers resources at a request from the mobile terminal system 61. In this example, it is assumed that the "immediate delivery" has been performed. That is, the delivering source system 41 attempts to directly deliver the requested resources to the mobile terminal system 61. Therefore, the resources are not stored in the external storage device 27 in the relay system 51.

If the mobile terminal system 61 cannot receive the resources for any reason (for example, by turning off a power supply), the delivering source system 41 delivers the resources previously transmitted to the mobile terminal system 61 to the relay system 51. Upon receipt of the resources, the relay system 51 stores the resources in the external storage device 27 provided in the relay system 51. Then, upon receipt of a request from the mobile terminal system 61, the relay system 51 delivers the resources to the mobile terminal system 61.

Thus, in the resource delivering shown in FIG. 22, when a mobile terminal system fails in receiving resources, the resources are delivered from a delivering source system to a relay system, and held there. Therefore, the mobile terminal system can obtain the resources by being connected to the relay system later.

Figure 23:
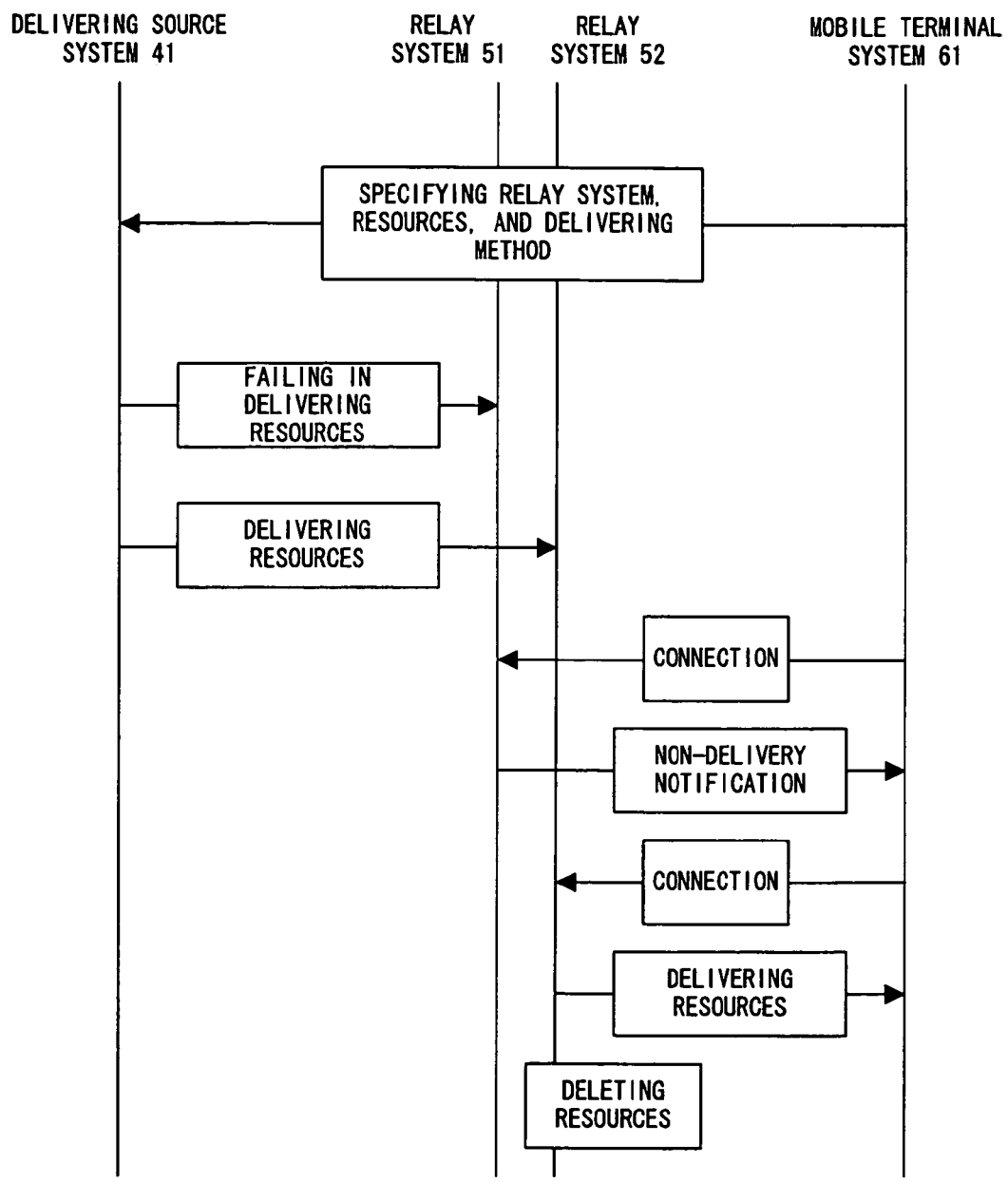
FIG. 23 shows a seventh example of resource delivering sequence.

FIG. 23 shows a seventh example of resource delivering sequence. In FIG. 23, a method of delivering resources on the assumption that the resources may be unsuccessfully delivered from a delivering source system to a relay system is described.

In this case, the mobile terminal system sets in a request message to be transmitted to the delivering source system one or more substitute relay systems together with a relay system for receiving resources. In the example shown in FIG. 23, the relay system 51 is set as a relay system for receiving resources, and the relay system 52 is set as a substitute relay system. The substitute relay system is specified using a substitute relay system identifier shown in FIG. 8.

Upon receipt of the request message, the delivering source system 41 first delivers the resources requested by the mobile terminal system 61 to the relay system 51. If the resources are unsuccessfully delivered to the relay system 51, the delivering source system 41 delivers the resources to the relay system 52.

The mobile terminal system 61 is first connected to the relay system 51 to receive the requested resources. If the resources are not stored in the relay system 51, the relay system 51 notifies the mobile terminal system 61 that they are not stored in the relay system 51.

The mobile terminal system 61 repeatedly performs the connecting process on the relay system 51. If the resources cannot be obtained after repeatedly performing the connecting process for predetermined times, it is connected to a relay system (the relay system 52 in this example) specified as a substitute relay system by the request message. In response to the connection, the relay system 52 delivers the resources received from the delivering source system 41 to the mobile terminal system 61. Then, the relay system 52 deletes the resources from its storage device.

Thus, even when resources are unsuccessfully delivered from a delivering source system to a relay system, a mobile terminal can receive resources without fail through a substitute relay system by specifying the substitute relay system in advance.

Figure 24:
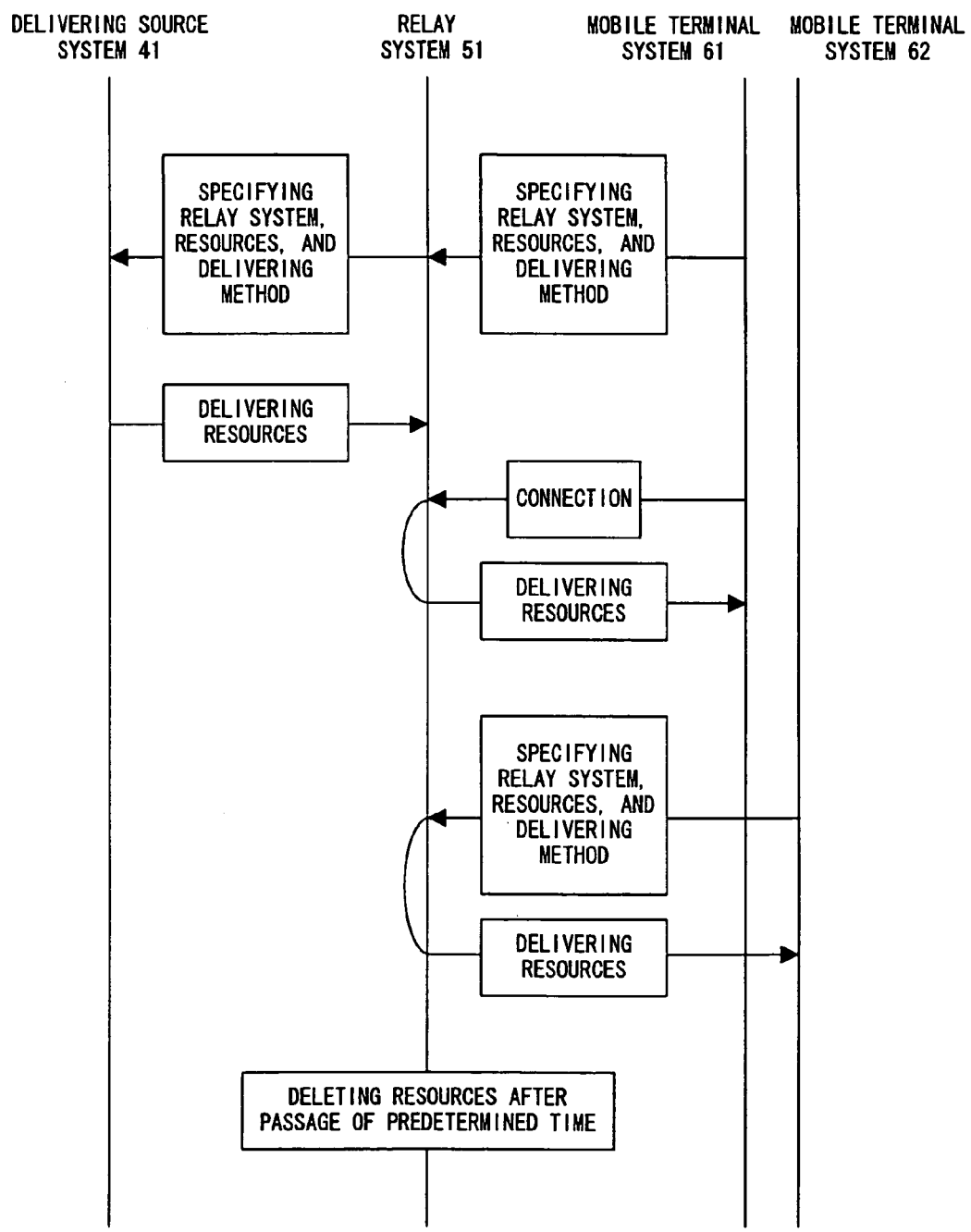
FIG. 24 shows a eighth example of resource delivering sequence.

FIG. 24 shows a eighth example of resource delivering sequence. In the resource delivering shown in FIG. 24, a relay system has various functions. In this example, it is assumed that the relay system 51 is a gateway machine provided between an external network and an internal network.

When the relay system 51 receives the request message transmitted from the mobile terminal system 61, it analyzes the message. Based on the "resource identifier" specified in the message, a delivering source system (the delivering source system 41 in this example) storing the resources identified by the identifier is specified. When the relay system 51 is not specified as a relay system identifier of the message, the relay system 51 is added as a relay system identifier of the message. Then, the message is transmitted to the delivering source system 41.

The delivering source system 41 delivers the resources requested by the mobile terminal system 61 to the relay system 51 according to the received message. Then, the relay system 51 stores the resources in the external storage device of the system. If a relay system other than the relay system 51 is specified in the message, the same resources are delivered to the other specified relay system.

When the relay system 51 receives a connection message from the mobile terminal system 61, it delivers to the mobile terminal system 61 the resources corresponding to the request message previously received from the mobile terminal system 61. When the relay system 51 receives a request message from the mobile terminal system 62, it analyzes the message, and checks whether or not the resources requested by the message are stored in the system. If the resources are stored in the system, the resources are immediately delivered to the mobile terminal system 62. If the resources are not stored in the relay system 51, the delivering source system of the resources requested by the message is specified, and the request message is transferred to the specified delivering source system. Thus, the resources are obtained and delivered to the mobile terminal system 62.

If a predetermined time has passed after the resources are received from the delivering source system 41, the relay system 51 deletes the resources.

Thus, in the resource delivering shown in FIG. 24, the transmission and reception of data between a relay system and a delivering source system can be reduced, and the connection time between a mobile terminal system and a relay system can be shortened.

Figure 25:
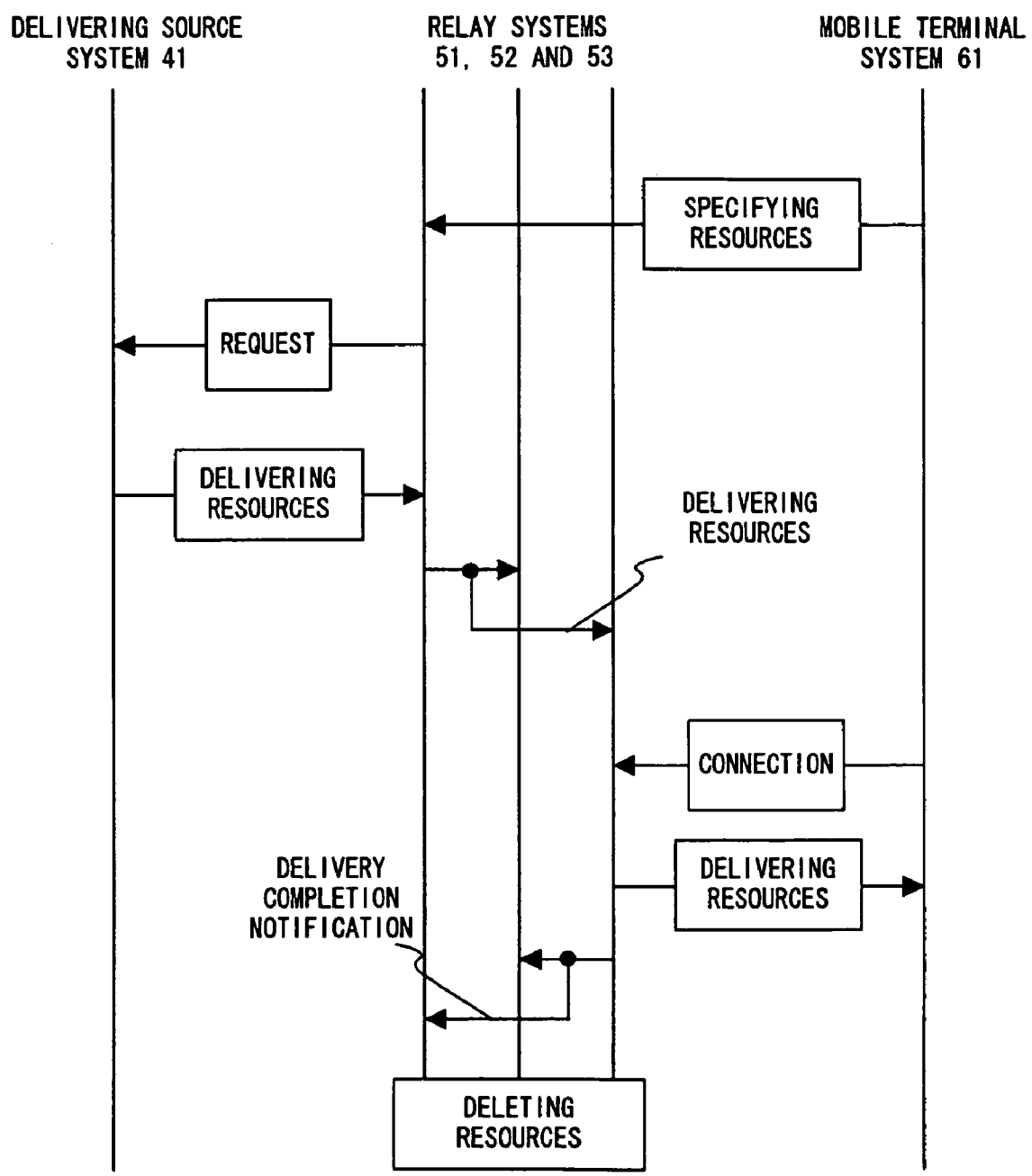
FIG. 25 shows a ninth example of resource delivering sequence.

FIG. 25 shows a ninth example of resource delivering sequence. In the resource delivering shown in FIG. 25, a relay system which receives resources from a delivering source system has the function of delivering the resources to another relay system.

In this resource delivering, the mobile terminal system 61 notifies any relay system of the request message specifying desired resources. In this example, it notifies the relay system 51 of the message. The mobile terminal system 61 temporarily disconnects the line for connection to the relay system 51.

Upon receipt of the request message, the relay system 51 searches for a site through which the resources specified by the message can be delivered. In this example, it is assumed that the resources specified by the mobile terminal system 61 are stored in the delivering source system 41. The delivering source system 41 delivers the resources specified by the request to the relay system 51.

The relay system 51 stores the received resources in its system, and delivers the resources to all other relay systems. In this example, they are delivered to the relay systems 52 and 53. The relay systems 52 and 53 store the resources in their own systems.

The mobile terminal system 61 can receive the resources from any relay system in the relay systems 51 through 53. In this embodiment, the mobile terminal system 61 accesses the relay system 53 from which the mobile terminal system 61 receives the resources.

Then, the relay system which delivers the resources to the mobile terminal system 61 transmits a delivery completion notification message to all other relay systems. In this example, a delivery completion notification message is transmitted from the relay system 53 to the relay systems 51 and 52. Then, the relay systems 51 through 53 discard the resources stored in the respective systems.

Thus, in this resource delivering, a mobile terminal system can receive resources from any relay system. Therefore, a relay system which transfers data in the shortest time is selected to provide resources. Thus, the communications cost can be reduced.

Although not shown in the attached drawings, the relay system can also manage a resource delivering method. In this case, for example, according to a message from a mobile terminal system or at an instruction from a user of the resource delivering system, a resource delivering management list is generated in a relay system, and a delivering method is entered in the list. The relay system accesses a delivering source system according to the delivering method entered in the list, and obtains corresponding resources. For example, if "at seven in the morning" is set in the resource delivering management list of a relay system in a system for delivering newspaper data, then the relay system accesses a delivering source system at seven in the morning, obtains resources (newspaper data), and stores them in its system.

Based on the connection from the mobile terminal system (a subscriber of newspaper delivering), it delivers the resources (newspaper data).

In the system according to the present embodiment, not a telephone number, IP address, etc. but a logical identifier can be used as an identifier for identification of a mobile terminal system. In this case, the logical identifier can be set in the connection message from each mobile terminal system to a relay system. The relay system generates a destination list based on the logical identifier, and manages the status of the mobile terminal system.

In the resource delivering system, at an instruction from a mobile terminal system, a relay system, or a delivering source system, any method can be selected from among a method of delivering resources from a delivering source system to all relay systems (for example, when a relay system is not set in a request message), a method of delivering resources only to a relay system specified by a mobile terminal device (FIG. 7 for example), and a method of delivering resources to a relay device which receives information for specifying resources from a terminal device (FIG. 24 for example).

Then, by referring to a flowchart, the operations of a delivering source system and a relay system are described below.

Figure 26:
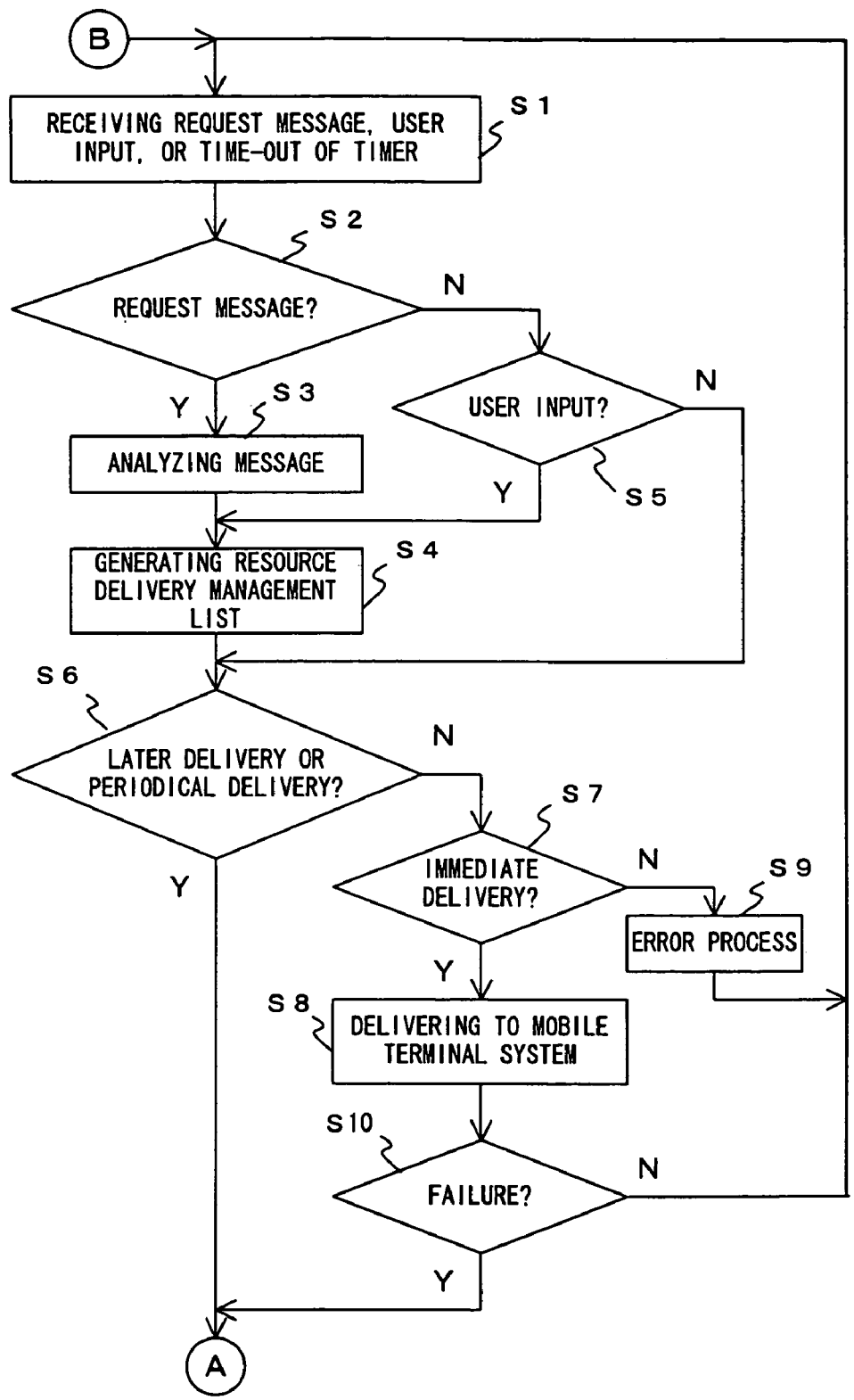
FIG. 26 is a flowchart (1) of the operation of the delivering source system.
Figure 27:
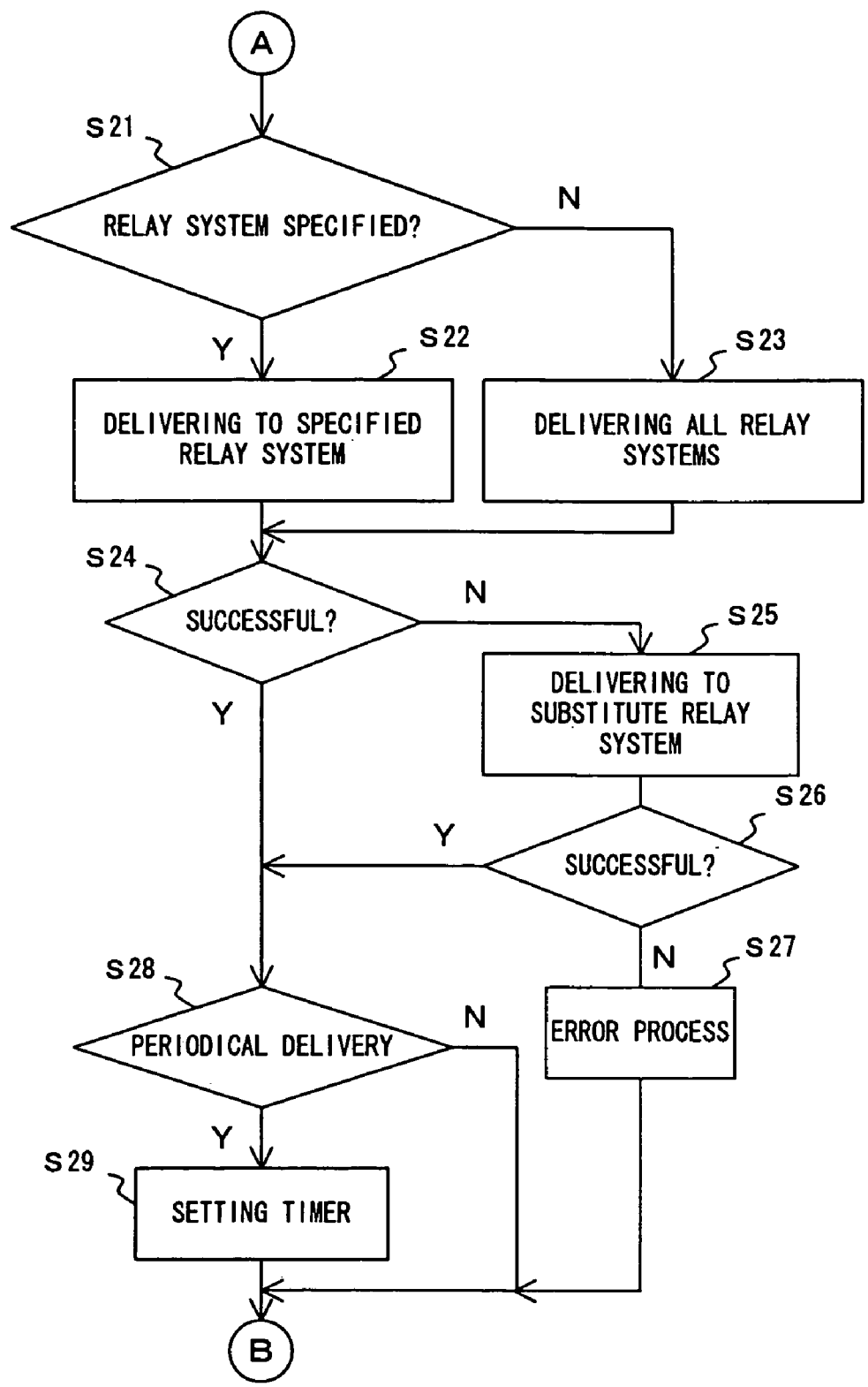
FIG. 27 is a flowchart (2) of the operation of the delivering source system.

FIGS. 26 and 27 are flowcharts of the operations of a delivering system. The operations in the flowchart are performed when a delivering source system receives a request message from a mobile terminal system (or a relay system), when a user of the resource delivering system input an instruction to deliver resources, or when a timer for periodical resource delivering enters a time out.

In step S1, a request message is received, a user inputs an instruction, or a timer enters a time out. In step S2, it is checked whether or not an event occurring in step S1 is the reception of a request message. If a request message has been received in step S1, then the message is analyzed in step S3. Thus, the resources to be delivered to a mobile terminal system, a relay system for receiving the message, the existence of a substitute relay system, a resource delivering method, etc. are recognized. Then, in step S4, a resource delivering management list is generated according to the analysis in step S3. The resources delivering management list is, for example, represented in the format described by referring to, for example, FIG. 9.

When a request message is not received in step S1 (NO in step S2), it is checked in step S5 whether or not an instruction is input by a user. If a user has input an instruction in step S1, then the resource delivering management list is generated according to the input instruction in step S4. If a user has not input an instruction in step S1 (NO in step S5), then it is assumed that the timer has entered a time out for periodical resource delivering, thereby passing control to step S6.

In step S6, it is checked whether or not "later delivering" or "periodical delivery" is specified as a method of delivering resources by referring to the resource delivering management list. When the process in the flowchart has been activated by the time out of the timer for periodical resource delivering, the resource delivering management list is generated according to the previous request message or an input from a user, and the previously generated list is referred to in step S6.

If "later delivery" or "periodical delivering" is specified, control is passed to step S21. If not, control is passed to step S7. In step S7, it is checked whether or not "immediate delivery" is specified as a method of delivering resources. If yes, control is passed to step S8. If not, an error process is performed in step S9.

In step S8, the resource delivering management list is referred to and the resources are delivered to a mobile terminal system. In step S10, it is determined whether or not the resources delivering has failed. The determination is made by checking whether or not a receipt notification is received from the mobile terminal system within a predetermined time, or whether or not a non-delivering notification is received from the mobile terminal system. When the resource delivering to the mobile terminal system fails, control is passed to step S21. FIG. 22 shows an example that the resource delivering from a delivering source system to a mobile terminal system fails.

In step S21, the resource delivering management list is referred to, and it is checked whether or not a relay system has been specified by a request from a mobile terminal system or an input by a user. If a relay system is specified, resources are delivered to one or more specified relay systems in step S22. If no relay system is specified, resources are delivered to all connectable relay systems in step S23.

In step S24, it is checked whether or not the delivering has succeeded in step S22 or S23. If the resource delivering has failed, the resource delivering management list is referred to in step S25, and the resources are delivered to a substitute relay system. FIG. 23 shows an example that resources are delivered to a substitute relay system.

In step S26, it is checked whether or not the resource delivering to the substitute relay system has succeeded. If it has succeeded, control is passed to step S28. If it has failed, an error process is performed in step S27.

In step S28, it is checked whether or not "periodical delivery" has been specified as a method of delivering resources. If "periodical delivery" is specified, a timer is set for the subsequent resource delivering in step S29.

Figure 28:
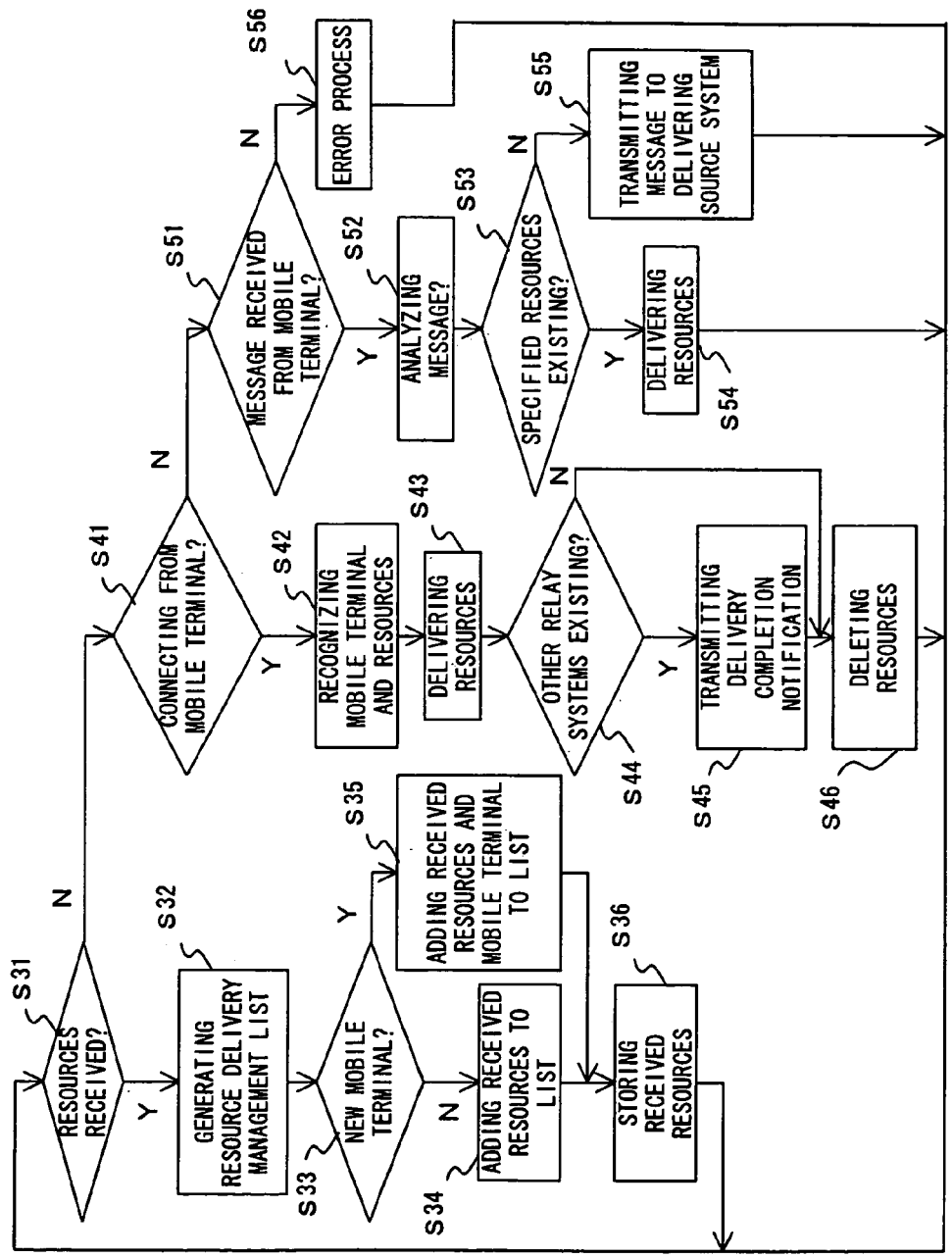
FIG. 28 is a flowchart of the operation of the relay system.

FIG. 28 is a flowchart of the operations of a relay system. The operations in the flowchart are performed when a relay system receives resources from a delivering source system, is connected to a mobile terminal system, or receives a request message from a mobile terminal.

In step S31, it is checked whether or not resources have been received from a delivering source system. Resources are transmitted, for example, in the format shown in FIG. 10. When resources are received from a delivering source system, control is passed to step S32. Otherwise, control is passed to step S41.

In step S32, a resource delivering management list is generated according to the information received with the resources. The resource delivering management list has been described by referring to FIG. 11A. In step S33, it is checked whether or not the mobile terminal system specified in the information received with the resources has been entered in the resource delivering management list. If the mobile terminal system has already been entered, the received resources are added to the resource delivering management list in step S34. If it has not been entered yet, the mobile terminal system and the resources are added in step S35. Then, in step S36, the resources received from a delivering source system are stored in the external storage device.

In step S41, it is checked whether or not a connection message from a mobile terminal system has been received. If a connection message has been received, then control is passed to step S42. Otherwise, control is passed to step S51. In step S42, a resource delivering management list is referred to using a connection message to recognize the resources to be delivered to the mobile terminal system. In step S43, the recognized resources are delivered to the mobile terminal system.

In step S44, a resource delivering management list is referred to, and it is checked whether or not there is a relay system which has received the same resources from a delivering source system. If such a relay system exists, a delivery completion notification message is transmitted to such relay systems in step S45. Then, in step S46, resources delivered to a mobile terminal system are deleted.

In step S51, it is checked whether or not a request message has been received from a mobile terminal system. If a request message has been received, control is passed to step S52. Otherwise, an error process is performed in step S56. The processes in steps S52 through S55 are performed in an embodiment shown in FIG. 24.

In step S52, a request message received from a mobile terminal is analyzed. Thus, at least the resources requested by a mobile terminal system are recognized. In step S53, a resource delivering management list is referred to, and it is checked whether or not the resources specified by the request message have been stored in the relay system. If the resources have been stored, the resources are delivered to a mobile terminal system in step S54. If the resources have not been stored, then the request message received from a mobile terminal is transferred to a delivering source system in step S55.

Figure 29:
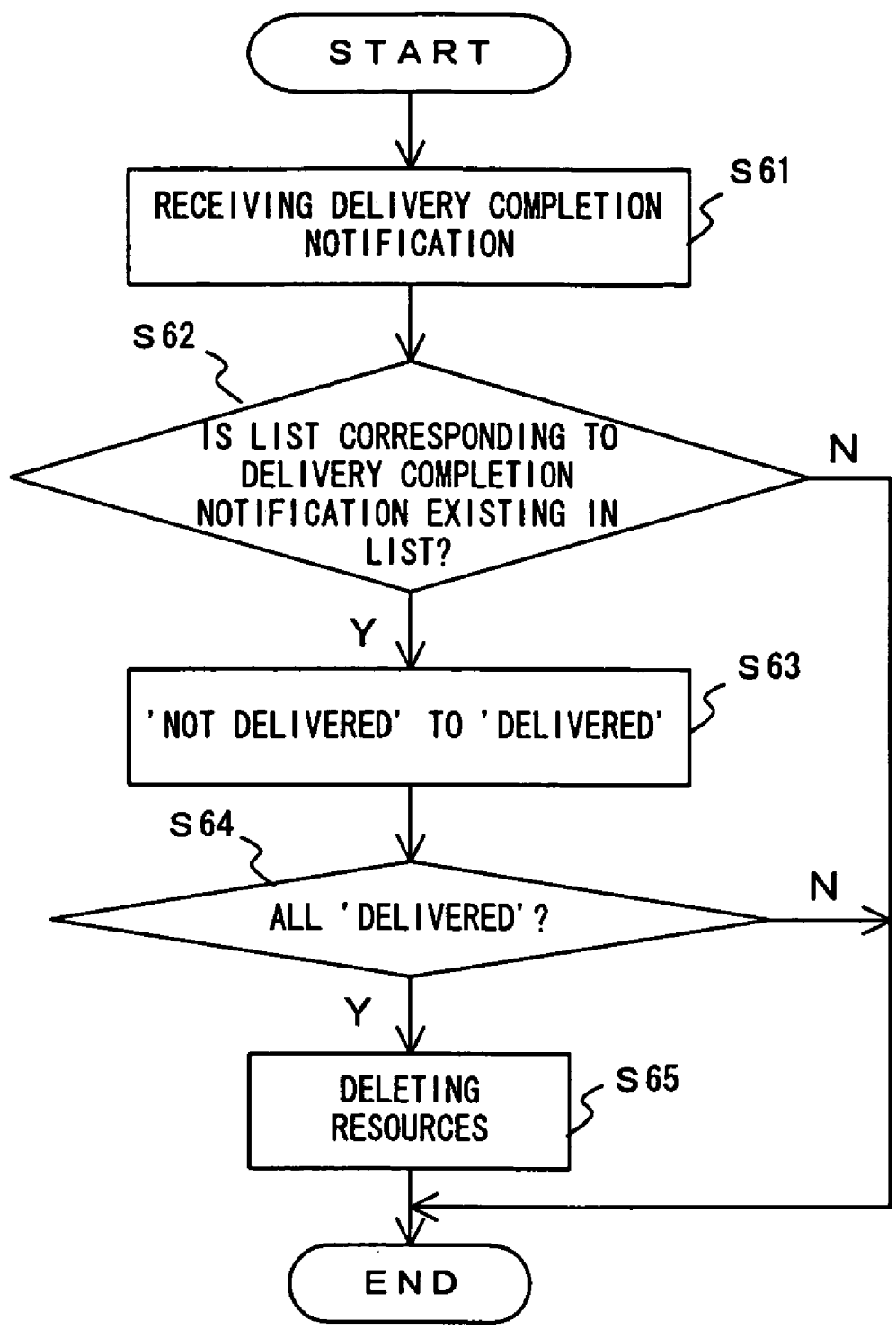
FIG. 29 is a flowchart of the operation of the relay system which has received a delivering completion notification.

FIG. 29 is a flowchart of the operations of a relay system which has received a delivery completion notification from another relay system.

In step S61, a delivery completion notification is received from another relay system. The delivery completion notification is transmitted in step S45 shown in FIG. 28. A delivery completion notification contains information identifying a relay system which has issued the notification and information identifying the resources already delivered to a mobile terminal system, as shown in FIG. 17.

In step S62, it is checked whether or not the information set in the received delivery completion notification has been entered in the resource delivering management list. Practically, it is checked whether or not the resources delivered to a mobile terminal system by another relay system have been entered in the resources list of the resource delivering management list. If it has already been entered, then the delivering status of a record corresponding in the resource list is changed from "not delivered" to "delivered". Then, in step S64, it is checked in the resource delivering management list whether or not all records have been changed into "delivered". In step S65, the resources received from a delivering system are discarded, if all records have been changed into "delivered".

Figure 30:
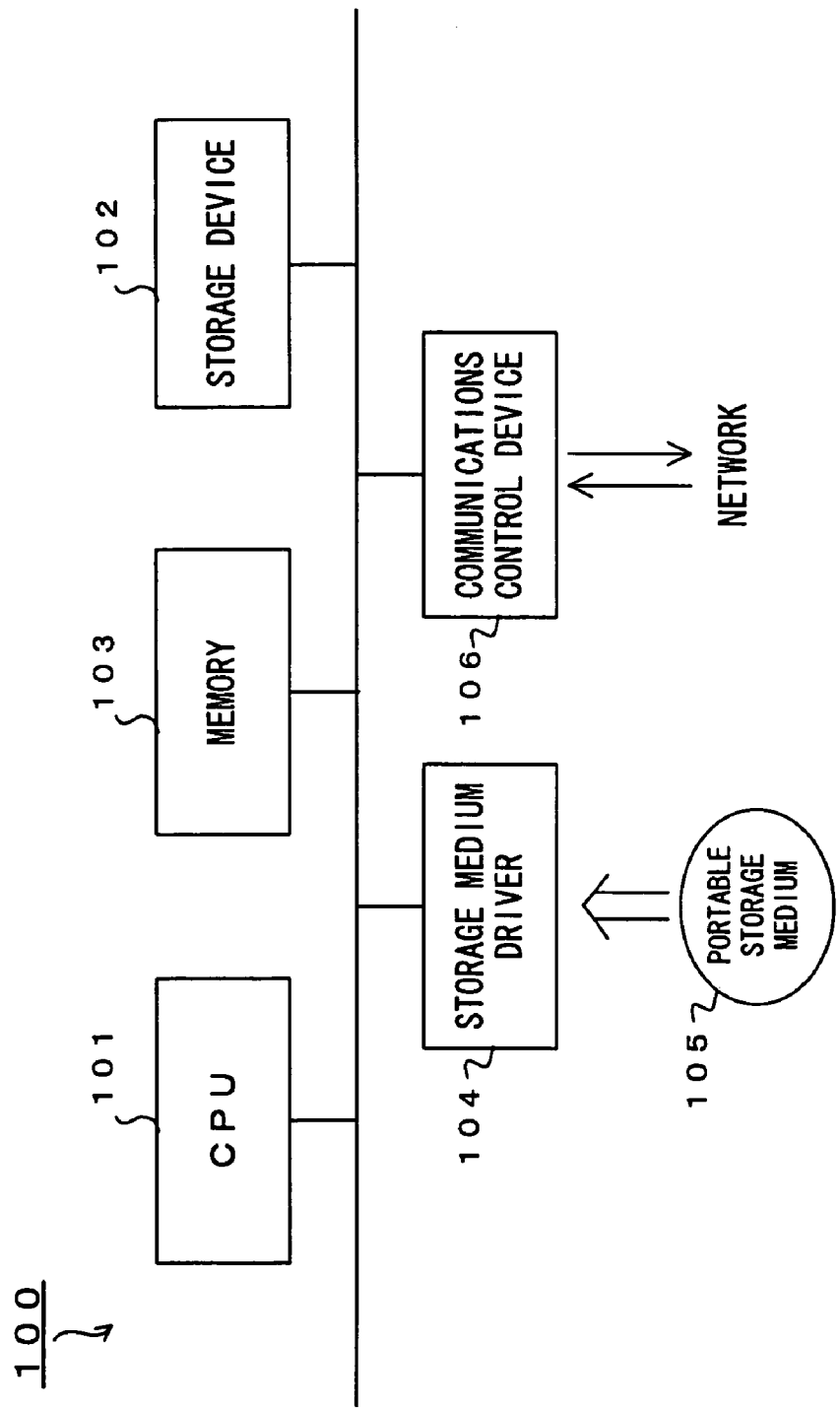
FIG. 30 is a block diagram of the computer which executes a program containing the function of the present invention.

The function for realizing the above mentioned resource delivering can be realized by executing a program describing the process in the above mentioned flowchart using a computer (including a device having information processing function). FIG. 30 is a block diagram of a computer 100 for executing the program.

A CPU (including a microcomputer) 101 executes a program describing the process of the above mentioned flowchart by loading the program from a storage device 102 to memory 103. The storage device 102 can be, for example, a hard disk, and stores the program. The memory 103 can be, for example, semiconductor memory, and is used as a work area of the CPU 101.

A storage medium driver 104 accesses a portable storage medium 105 at an instruction of the CPU 101. The portable storage medium 105 includes, for example, a semiconductor device (a PC card, etc.), a medium (a floppy disk, a magnetic tape, etc.) for inputting and outputting information in a magnetic operation, a medium (an optical disk, etc.) for inputting and outputting information in an optical operation. A communications control device 106 transmits and receives data to and from a network at an instruction of the CPU 101.

FIG. 31 shows the method of providing a software program, etc. relating to the present invention. A program relating to the present invention is provided in, for example, any of the following methods.

(a) Provided by being installed in the computer 100. In this case, a program, etc. is pre-installed before delivery.

(b) Provided by being stored in a portable storage medium.

In this case, a program, etc. stored in the portable storage medium 105 is installed in the storage device 102 basically through the storage medium driver 104.

(c) Provided from a server in a network. In this case, a program, etc. can be obtained by the computer 100 downloading a program, etc. stored in the server. Another Embodiment of the resource delivering system to which the present invention is applied In the embodiment, an information communications appliance (hereinafter referred to as "portable information communications appliance") such as a note-type personal computer, a portable telephone, etc. is used as a mobile terminal system, and an accessory device with which the portable information communications appliance can be attached and removed as a relay system. An accessory device can be, for example, a "dock (short for a docking station)".

Figure 32:
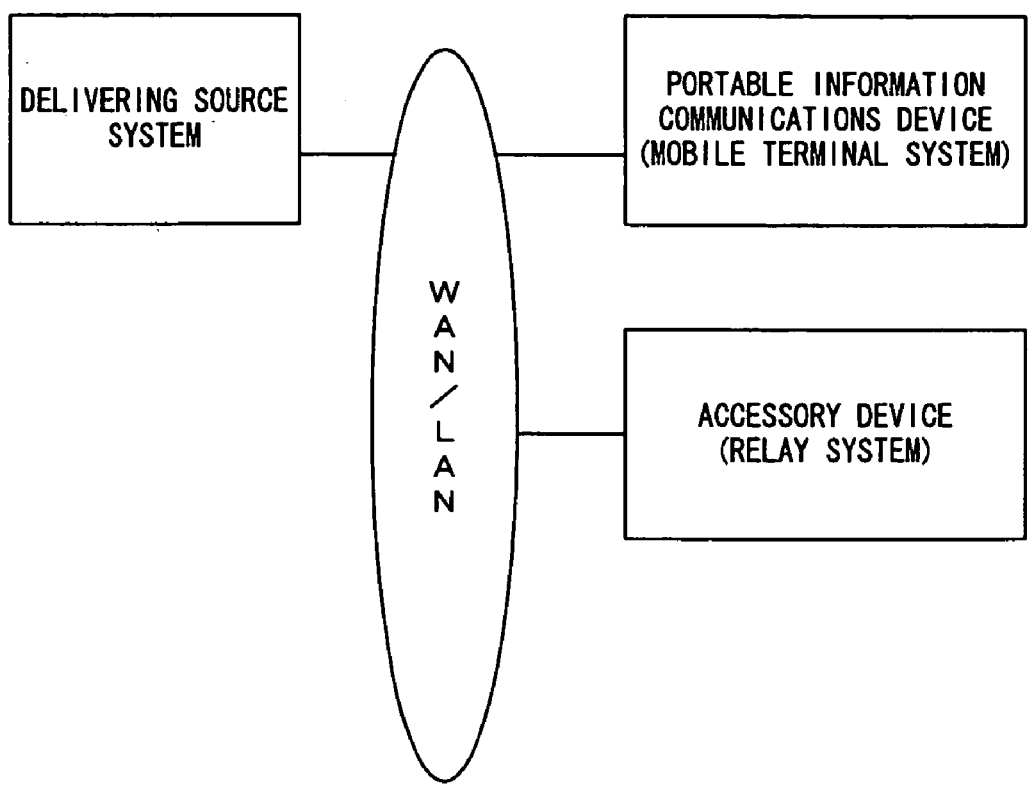
FIG. 32 shows the entire configuration of the resource delivering system according to an embodiment of the present invention.

FIG. 32 shows the entire configuration of the resource delivering system according to the present embodiment. In the embodiment, a delivering source system, a relay system, and a mobile terminal system are connected to a WAN or a LAN. When resources are immediately delivered to a mobile terminal system, the delivering source system delivers the resources directly to the mobile terminal system. Otherwise, the resources are delivered to the relay system. When the resources are delivered to the relay system, the mobile terminal system receives the resources from the relay system.

Figure 33:
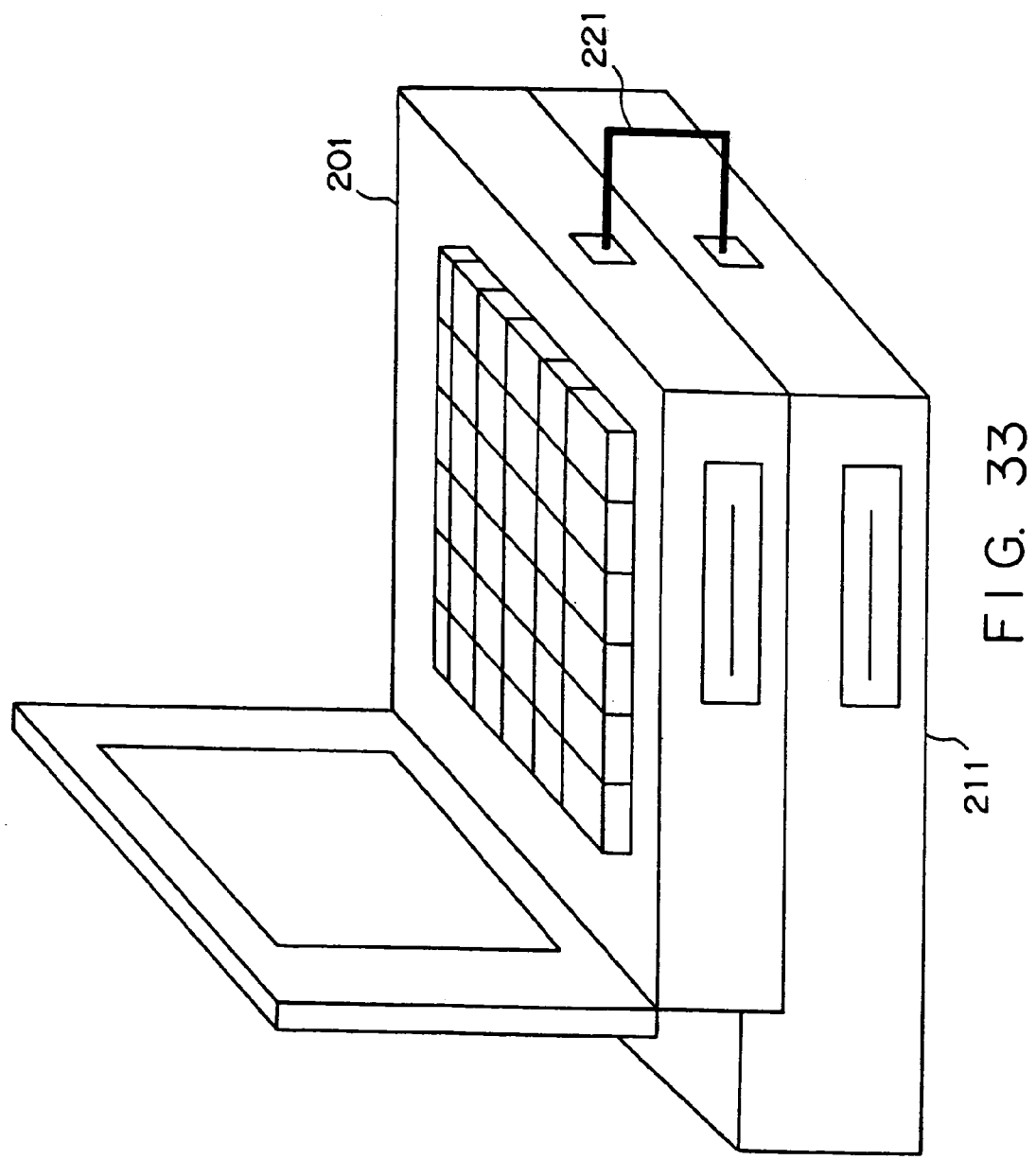
FIG. 33 shows the appearance of the mobile terminal system and the relay system according to an embodiment of the present invention.

FIG. 33 shows the appearance of the mobile terminal system (portable information communications device) and the relay system (accessory device) according to the embodiment. In this embodiment, a portable information communications device 201 is a note-type personal computer. The portable information communications device 201 is connected to an accessory device 211 through a connections device 221. The connections device 221 is, for example, a serial transmission interface (RS232C, etc.).

The accessory device 211 has the function of processing information. In this point, the accessory device 211 is included in a computer, but the performance can be lower than that of a common personal computer. The accessory device 211 does not have to be provided with an input device such as a keyboard, etc.

Figure 34:
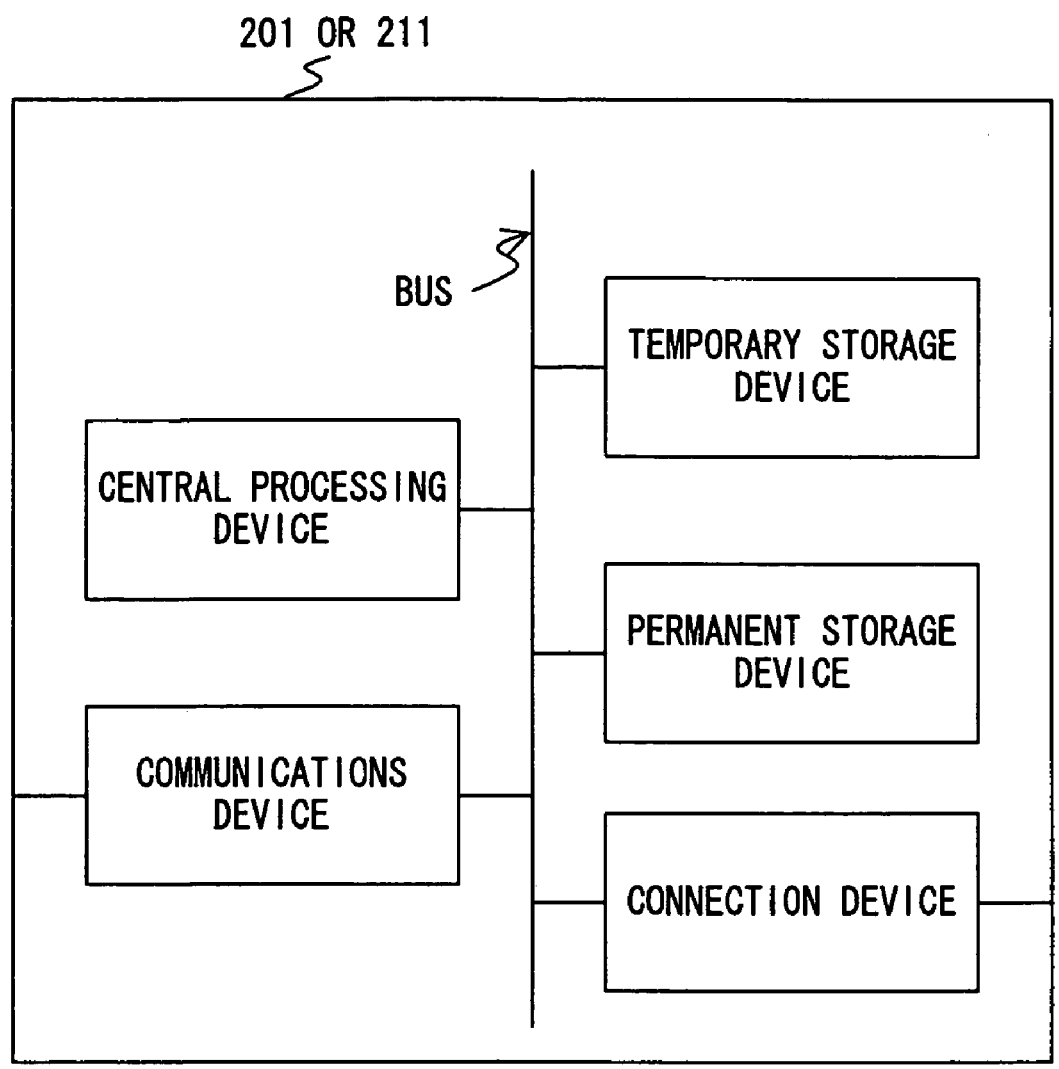
FIG. 34 shows the configuration of a portable information communications device and a accessory device.

FIG. 34 shows the configuration of the portable information communications device 201 and the accessory device 211. Since the basic configurations of these devices are the same as each other, they are represented in a sheet of drawing. However, the performance of the processor, the capacity of the storage device, etc. are different from each other.

Each of the portable information communications device 201 and the accessory device 211 comprises a central processing unit, a temporary storage device (DRAM, etc.), a permanent storage device (hard disk, etc.), and a communications device (modem card.). Each of these devices is basically the same as that described by referring to FIG. 30. Therefore, the detailed explanation is omitted here. Each of the portable information communications device 201 and the accessory device 211 has a connection device. The connection device is, for example, a serial transmission interface board for connection between the portable information communications device 201 and the accessory device 211.

Figure 35:
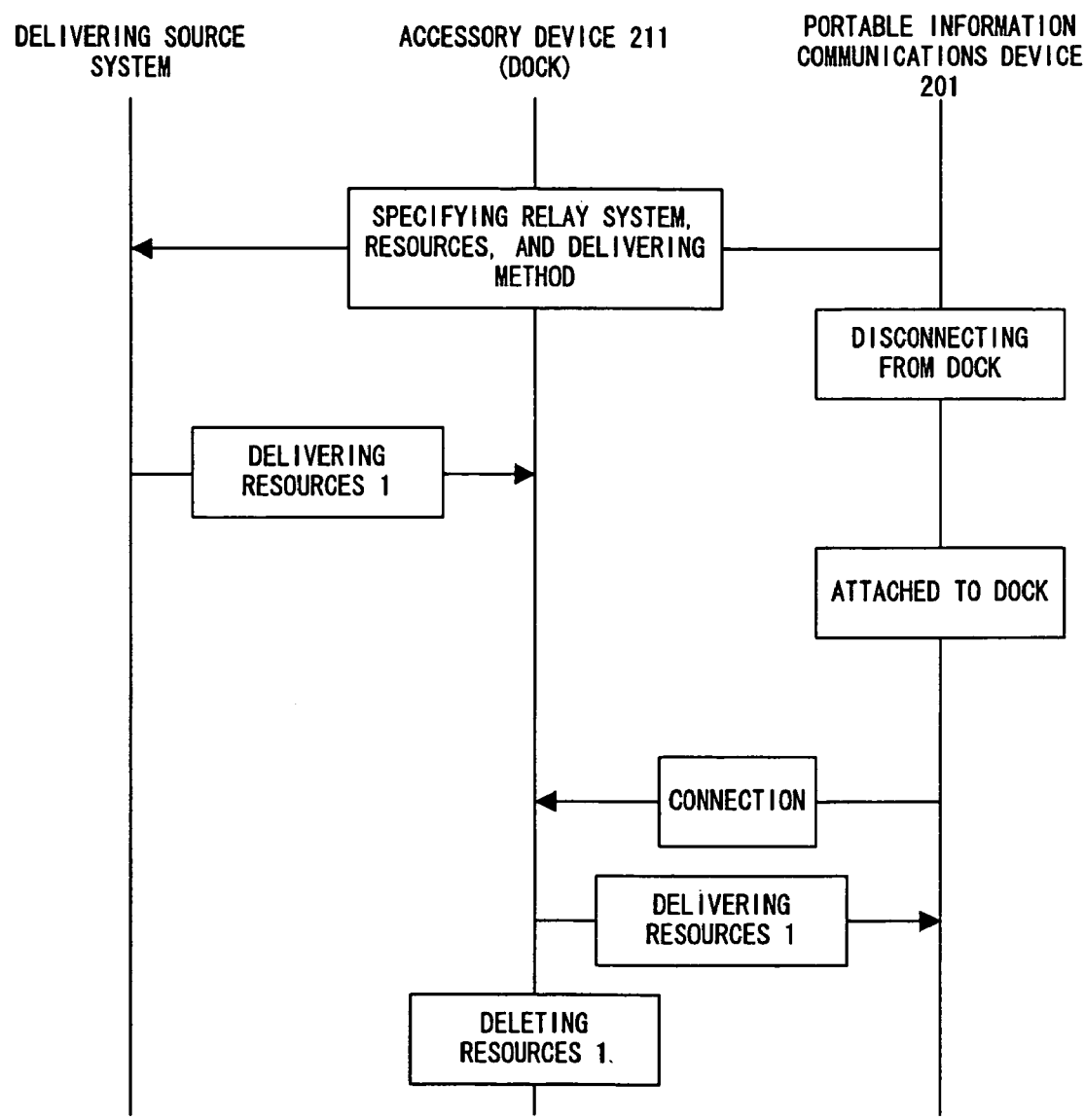
FIG. 35 shows a resource delivering sequence according to an embodiment of the present invention.

FIG. 35 shows the resource delivering sequence according to the embodiment. The resource delivering corresponds to the resource delivering shown in FIG. 7.

The portable information communications device 201 transmits a resource delivering request to a delivering source system. The request specifies "resources 1" as resources to be delivered, and specifies "accessory device 211" as are lay system. The portable information communications device 201 can transmit the request through the accessory device 211, or without the accessory device 211.

The delivering source system delivers the resources 1 to the accessory device 211 at the request. At this time, it is not necessary to connect the portable information communications device 201 to the accessory device 211. When the portable information communications device 201 requests to receive resources, it is connected to the accessory device 211 through the connections device 221 shown in FIG. 33, and receives the resources 1 therefrom. According to the embodiment, the sequence corresponding to FIG. 7 is described, but other embodiments can be realized.

Since a mobile terminal can specify a relay system for temporarily storing resources to be delivered from a delivering source system, the resources can be immediately received at a desired location. In addition, since a plurality of relay systems can be specified, the resources can be received without fail even if a part of a line becomes faulty. Furthermore, in a push-type resource delivering, the resources can be stored in a relay system even if a mobile terminal is in a state in which it cannot receive the resources when the resources are transmitted from the delivering source system. Therefore, the mobile terminal can receive the resources without fail. Thus, the time required to deliver resources can be practically shortened.

What is claimed is:

1. A method of delivering resources used in a system where there are a plurality of relay devices between a delivering source device which delivers resources and a terminal device which can access any of the plurality of relay devices and receives the resources, each of the relay devices being respectively settled at a corresponding location, comprising:

connecting a first relay device located in a first location and the terminal device;

notifying from the terminal device to the delivering source device via the first relay device of information specifying resources to be delivered and a second relay device located in a second location as a destination device of the resources, the second location being far away from the first location;

delivering the resources specified by the notification from the delivering source device to the second relay device specified by the notification;

disconnecting a path between the first relay device and the terminal device, when the terminal device leaves the first location;

connecting the second relay device and the terminal device, after the terminal device travels from the first location to the second location; and delivering the resources from the second relay device to the terminal device according to an access from the terminal device.

2. The method according to claim 1, wherein a logical identifier is used as information identifying the terminal device.

3. A method of delivering resources used in a system where there are a plurality of relay devices between a delivering source device which delivers resources and a terminal device which can access any of the plurality of relay devices and receives the resources, each of the relay devices being respectively settled at a corresponding location, comprising:

connecting a first relay device located in a first location and the terminal device;

notifying from the terminal device to the delivering source device via the first relay device of information specifying a second relay device located in a second location as a destination device of resources from the delivering source device, the second location being far away from the first location;

delivering resources from the delivering source device to the second relay device specified by the notification;

disconnecting a path between the first relay device and the terminal device, when the terminal device leaves the first location;

connecting the second relay device and the terminal device, after the terminal device travels from the first location to the second location; and delivering the resources from the second relay device to the terminal device according to an access from the terminal device.

4. A method of delivering resources used in a system where there are a plurality of relay devices between a delivering source device which delivers resources and a terminal device which can access any of the plurality of relay devices and receives the resources, comprising:

connecting a first relay device located in a first location and the terminal device;

notifying from the terminal device to the delivering source device via the first relay device of information specifying a first relay device located in a first location and a second relay device located in a second location as destination devices of resources from the delivering source device, the second location being far away from the first location;

delivering resources from the delivering source device to the first and the second relay devices;

disconnecting a path between the first relay device and the terminal device, when the terminal device leaves the first location;

connecting the second relay device and the terminal device, after the terminal device travels from the first location to the second location; and delivering the resources from the first or second relay device to the terminal device according to an access from the terminal device.

5. The method according to claim 4, wherein:

when the resources are delivered from the first relay device to the terminal device according to the access from the terminal device, the resources are deleted from the first relay device;

the first relay device transmits a delivery completion notification to the second relay device; and the resources are deleted from the second relay device, when the second relay system receives the delivery completion notification.

6. A method of delivering resources used in a system where there are a plurality of relay devices between a delivering source device which delivers resources and a terminal device which can access any of the plurality of relay devices and receives the resources, comprising:

connecting a first relay device located in a first location and a first terminal device;

notifying from the first terminal device to the delivering source device via the first relay device of information specifying a second relay device located in a second location as a destination device of resources from the delivering source device, the second location being far away from the first location;

delivering resources from the delivering source device to the second relay device specified by the notification;

disconnecting a path between the first relay device and the first terminal device, when the first terminal device leaves the first location;

connecting the second relay device and the terminal device, after the terminal device travels from the first location to the second location;

delivering the resources from the second relay device to the first terminal device according to an access from the first terminal device; and delivering the resources from the second relay device to a second terminal device according to an access from the second terminal device.

7. The method according to claim 6, wherein the delivering source device does not deliver resources to the relay device when a notification of identical contents is received.

8. A method of delivering resources used in a system where there are a plurality of relay devices between a delivering source device which delivers resources and a terminal device which can access any of the plurality of the relay devices and receives the resources, comprising:

connecting a first relay device located in a first location and the terminal device;

notifying from the terminal device to the delivering source device via the first relay device of information specifying a second relay device located in a second location as a destination device of resources from the delivering source device, the second location being far away from the first location;

delivering resources from the delivering source device to the terminal device;

delivering resources from the delivering source device to the second relay device specified by the notification, when the delivering source device fails to deliver the resources to the terminal device;

disconnecting a path between the first relay device and the terminal device, when the terminal device leaves the first location;

connecting the second relay device and the terminal device, after the terminal device travels from the first location to the second location; and delivering the resources from the second relay device to the terminal device according to an access from the terminal device.

9. A method of delivering resources used in a system where there are a plurality of relay devices between a delivering source device which delivers resources and a terminal device which can access any of the plurality of relay devices and receives the resources, comprising:

connecting a first relay device located in a first location and the terminal device;

notifying from the terminal device to the delivering source device of information specifying the first relay device and a second relay device located in a second location as destination devices of resources from the delivering source device, the second location being far away from the first location;

delivering resources from the delivering source device to the first relay device;

delivering resources from the delivering source device to the second relay device, when the delivering source device fails to deliver the resources to the first relay device;

disconnecting a path between the first relay device and the terminal device, when the terminal device leaves the first location;

connecting the second relay device and the terminal device, after the terminal device travels from the first location to the second location; and delivering the resources from the first or second relay device to the terminal device according to an access from the terminal device.

* * * * *